(12) United States Patent
John et al.

(10) Patent No.: US 11,683,444 B2
(45) Date of Patent: *Jun. 20, 2023

(54) CROSS-APPLICATION FACILITATING OF VIDEO ROOMS

(71) Applicant: WhatsApp LLC, Menlo Park, CA (US)

(72) Inventors: Aby John, San Jose, CA (US); Valerie Rose, Lafayette, CA (US); Priyanka Kodikal, San Jose, CA (US); Ryan Andrew Wiggins, San Francisco, CA (US); Raluca-Elena Podiuc, Mountain View, CA (US); Charlotte Genevieve Duran, Torrance, CA (US); Scott William Ryder, Mountain View, CA (US)

(73) Assignee: WhatsApp LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,763

(22) Filed: May 24, 2022

(65) Prior Publication Data

US 2022/0286645 A1 Sep. 8, 2022

Related U.S. Application Data

(63) Continuation of application No. 17/196,733, filed on Mar. 9, 2021, now Pat. No. 11,375,157.

(60) Provisional application No. 63/014,928, filed on Apr. 24, 2020.

(51) Int. Cl.
*H04N 7/15* (2006.01)
*H04L 51/02* (2022.01)
*H04L 51/08* (2022.01)

(52) U.S. Cl.
CPC ............... *H04N 7/15* (2013.01); *H04L 51/02* (2013.01); *H04L 51/08* (2013.01)

(58) Field of Classification Search
CPC combination set(s) only.
See application file for complete search history.

(56) References Cited

U.S. PATENT DOCUMENTS

| | | | |
|---|---|---|---|
| 2011/0059730 A1 | 3/2011 | Scriven et al. | |
| 2012/0274725 A1* | 11/2012 | Robertson | H04L 65/1069 348/E7.078 |
| 2016/0173436 A1* | 6/2016 | Koolwal | H04L 51/52 709/206 |
| 2019/0356709 A1 | 11/2019 | Zlatarev | |

OTHER PUBLICATIONS

European Search Report for European Application No. 21169421.1, dated Sep. 16, 2021, 2 pages.

* cited by examiner

*Primary Examiner* — Amal S Zenati
(74) *Attorney, Agent, or Firm* — Keller Preece PLLC

(57) ABSTRACT

This disclosure describes a video room system that can generate a video room utilizing a cross-application technique by accessing functions of one application based on user interaction within a separate application. In particular, the disclosed systems can generate a video room that remains open for access by a creator device and invitee devices in a casual come-and-go fashion. The disclosed systems can further generate a video room link that is distributable intelligently to grant access to the video room to invitee devices. The disclosed systems can also automatically surface a video room link to an invitee device based on determining a digital connection between the invitee device and the creator device.

20 Claims, 25 Drawing Sheets

CROSS-APPLICATION FACILITATING OF VIDEO ROOMS

CROSS-REFERENCE TO RELATED APPLICATIONS

This application is a continuation of U.S. patent application Ser. No. 17/196,733, filed on Mar. 9, 2021, which claims the benefit of and priority to U.S. Provisional Application No. 63/014,928, filed Apr. 24, 2020, the full disclosure of which is incorporated herein by reference.

BACKGROUND

Advancements in software and hardware platforms have led to a variety of improvements in systems that connect client devices via the internet. For example, digital communication systems are now able to provide video calls between devices so that users can communicate with each other face-to-face over long distances. Some digital communication systems have even been developed that enable groups of more than two devices to connect within a common video conference.

Despite these advances however, conventional digital communication systems continue to suffer from a number of disadvantages, particularly in their efficiency and flexibility. For example, some conventional systems inefficiently utilize computing resources such as processing power, processing time, and memory in processing excessive numbers of user interactions to generate group video calls. More specifically, conventional systems require client devices to navigate through many layers, applications, and/or interfaces to access desired data or functionality to initiate a video call and/or to locate other client devices/users to invite to a group video call. Indeed, many conventional systems are siloed in the sense that they are specific to group video calls and therefore require independent navigation of multiple unaffiliated applications to, for example, initiate a group video call in a video call application and to distribute invitations for the group video call via an external contacts application with no connection to the video call application.

In addition to being inefficient, some conventional digital communication systems are also inflexible. For instance, some conventional systems are rigidly limited to facilitating group video calls only between devices that share a common platform. To elaborate, these conventional systems often require that devices within a common video conference utilize a particular software application or have an account with a particular software service entity. Even for those conventional systems that can facilitate video calls across different platforms, these conventional systems nevertheless rigidly require client devices to invite other client devices in a limited number of ways such as by sharing a link for a particular video conference.

Thus, there are disadvantages with regard to conventional digital communication systems.

SUMMARY

One or more embodiments described herein provide benefits and solve one or more of the foregoing or other problems in the art with systems, methods, and non-transitory computer readable media that can efficiently and flexibly generate video rooms for facilitating cross-platform video conferencing for groups of client devices by accessing functions of a second messaging application as a result of user interaction within a first messaging application. More specifically, the disclosed systems can flexibly create video rooms that remain open for commitment-free access by multiple user devices in a come-and-go fashion. To generate a video room, the disclosed systems can provide different entry points for creating (and/or joining) a video room from multiple applications such as a lightweight messaging application without capability to generate a video room but that is integrated with a video room generating application. The disclosed systems can also flexibly surface video rooms by, for example, automatically providing a video room link for display within a chat interface from which a video room element was selected with a video room link and/or automatically providing a video room link within a social networking feed based on connections between users. The disclosed systems can further facilitate video conferencing between the creator device and invitee devices associated with co-users of the social networking system and/or users not associated with the social networking system within a multi-platform video room.

Additional features and advantages of the present application will be set forth in the description which follows, and in part will be obvious from the description, or may be learned by the practice of such example embodiments.

BRIEF DESCRIPTION OF THE DRAWINGS

The detailed description refers to the drawings briefly described below.

DETAILED DESCRIPTION

Figure 1:
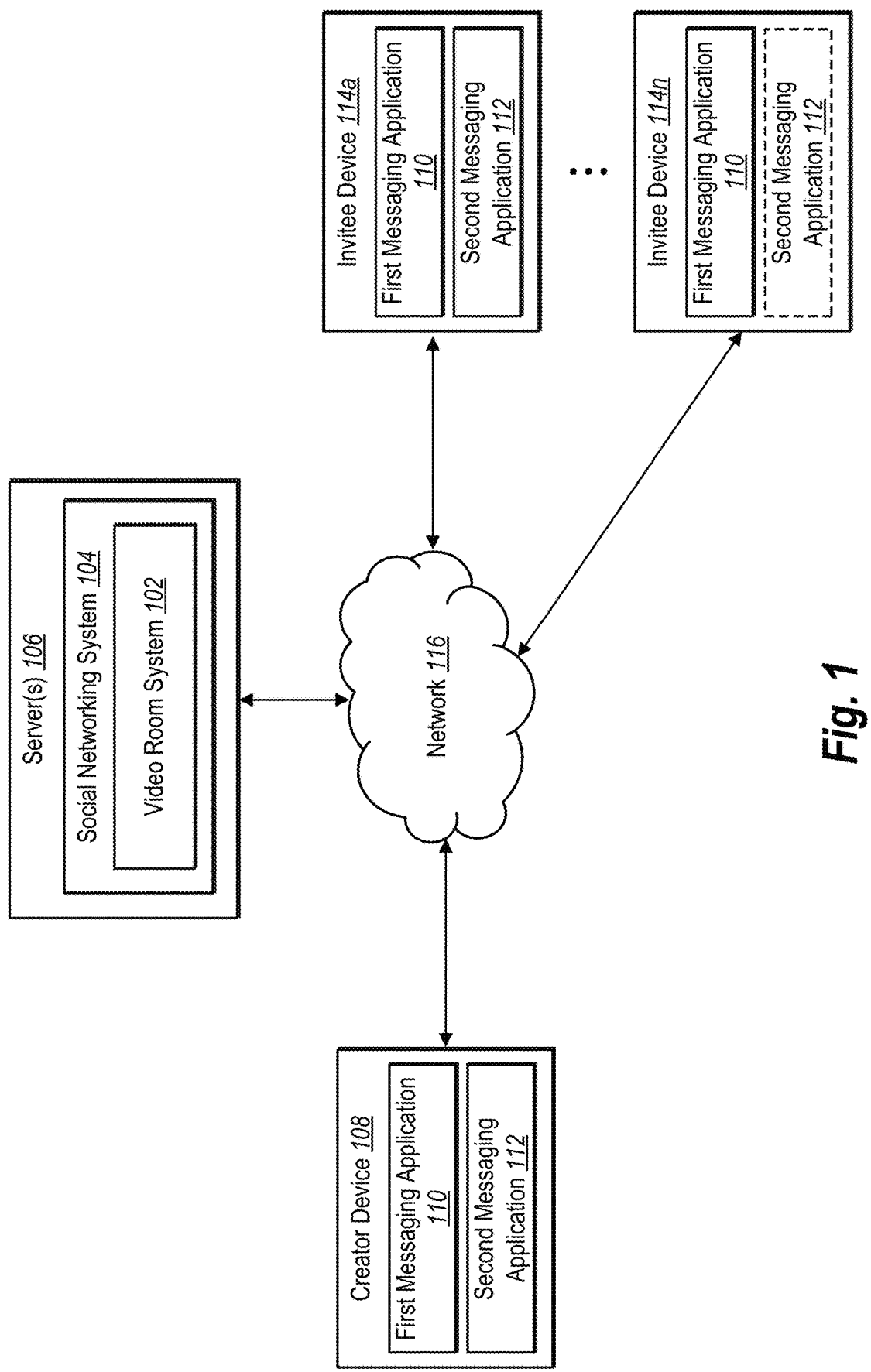
FIG. 1 illustrates a block diagram of an environment for implementing a video room system in accordance with one or more embodiments.

One or more embodiments described herein provide benefits and solve one or more of the foregoing or other problems in the art with a video room system that can generate video rooms for facilitating video communication between groups of client devices. In particular, the video room system can utilize different functionality of multiple integrated applications together (e.g., by handing off between applications) to generate a video room. For example, the video room system can provide an entry point for creating a video room within a first lightweight messaging application on a creator device to transition to a second messaging application that includes more functionality for generating a video room. The video room system can further surface a generated video room within the first messaging application (and/or the second messaging application) based on activity of the creator device. The video room system can also surface a video room in other ways based on connections between users within a social graph of a social networking system. Upon receiving an indication of a selection of a video room link to join the video room from an invitee device, the video room system can further authenticate the invitee device and add the invitee device to the video room.

As mentioned, the video room system can utilize multiple applications together to generate a video room. In particular, the video room system can provide entry points within a first messaging application in the form of video room elements selectable to access a second messaging application. Indeed, the video room system can access and utilize a second messaging application to generate a video room in response to user selection of a video room element from within a user interface of the first messaging application. The first messaging application can be a lightweight application with limited functionality (e.g., not including functionality to generate a video room), while the second messaging application can be a larger application (e.g., with functionality necessary to generate a video room). For example, to keep messaging and other communication secure between devices utilizing the first messaging application, the video room system utilizes end-to-end encryption and keeps much of the user information within the first messaging application private on the device end. This requires the video room system to access functions (e.g., APIs) of the second messaging application to perform certain tasks (e.g., generating a video room) that require additional user information not readily available via the first messaging application.

As also mentioned, the video room system can provide different entry points within the first messaging application for generating a video room (e.g., by transitioning or handing off to the second messaging application). More specifically, the video room system can provide selectable video room elements within various user interfaces of the first messaging application, such as a video call list interface, a chat interface (e.g., within a message attachment menu), and/or a new call interface. The video room system can surface video rooms to invitee devices differently based on receiving indications of selections of different video room elements within different user interfaces.

Based on receiving an indication of user selection of a video room element within a particular user interface of the first messaging application, the video room system can further determine how to generate a video room. For example, the video room system can determine that the first messaging application does not have capability to generate a video room and can determine whether a second messaging application with video room creation functionality is installed on the creator device. Based on determining whether a second messaging application is installed on the creator device, the video room system can select between the second messaging application and a browser application to generate a video room link. For instance, based on determining that the second messaging application is installed on the creator device, the video room system can access the second messaging application. Based on determining that the second messaging application is not installed on the creator device, on the other hand, the video room system can access a browser application and can navigate to a particular website with video room generation functionality. The video room link that can be sharable to invite invitee devices within a chat associated with the chat interface of the first messaging application to join the video room.

As just mentioned, the video room system can determine that a creator device has the second messaging application installed. In response, the video room system can access the second messaging application to generate the video room. In some embodiments, the video room system provides a notification for display within the first messaging application to request permission (or prompt) to access the second messaging application. Upon receiving an indication of user selection to hand off to the second messaging application, the video room system can access functions of the second messaging application to generate a video room and to provide a video room generation interface for display on the creator device.

Based on generating a video room and a corresponding video room link for sharing access to the video room, the video room system can surface the video room link to invitee devices in a variety of ways. For instance, the video room system can receive an indication of user selection of a video room element associated with a particular chat of the first messaging application, and the video room system can automatically (e.g., without additional user input) populate a chat interface for the chat with the video room link. As another example, the video room system can determine connections between users as indicated by a social graph associated with a social networking system (and/or the second messaging application) and can surface the video room link within social networking feeds and/or other interfaces of the second messaging application automatically based on the connections.

The video room system can further limit the sharing of a video room link. More specifically, the video room system can determine whether a video room link has been shared a threshold number of times (e.g., whether the video room link has been surfaced or provided to a threshold number of invitee devices). Based on determining that the video room system has shared the video room link at least the threshold number of times, the video room system can restrict the number of invitee devices with whom a video room link can be shared. For example, the video room system can limit the number of invitee recipients of a single message containing a particular video room link whose share threshold has been met.

In addition, the video room system can facilitate video conferencing between devices within a video room. For example, the video room system can add invitee devices and a creator device to a video room. The video room system can also receive and provide video and audio data to and from the devices within the video room. In some embodiments, the video room system can cause one invitee device to access a video room differently than another invitee device. For instance, the video room system can determine that a first invitee device is associated with the second messaging application and can therefore cause the first invitee device to access the video room via the second messaging application. The video room system can further determine that a second invitee device is not associated with the second messaging application and can therefore cause the second invitee device to access the video room via a browser application.

In some embodiments, the video room system can generate and facilitate a waiting room or a video room lobby. To elaborate, the video room system can generate a digital space where invitee devices can join without yet joining a video room. For example, the video room system can add invitee devices to a video room lobby to wait for a creator device to initiate a video room (e.g., in cases where invitee devices join before the creator device). As another example, the video room system can add invitee devices to a video room lobby based on other criteria as well, such as closeness/connectivity between user accounts and whether the invitee device is attempting to join the video room via a shared link or via a link not expressly shared to the invitee device (e.g., surfaced within a social networking feed). Additional detail regarding the video room lobby is provided below.

As suggested above, the video room system can provide several advantages over conventional digital communication systems. In particular, the video room system can improve efficiency over conventional digital communication systems. While some conventional systems require extensive user interaction (and subsequent processing of such excessive user interactions) to navigate between multiple separate applications to create digital meetings for video conferencing and to invite participants to those digital meetings, the video room system reduces the number of user interactions considerably. For instance, rather than requiring navigation between a video call application that is siloed from a separate sharing or messaging application (e.g., by tapping through multiple layers/interfaces within an operating system and within the separate applications), the video room system can provide integrated access for generating a video room using functions of a second messaging application directly within a first messaging application. Thus, the video room system utilizes fewer computing resources such as processing time, processing power, and memory in processing user interactions to access desired data and/or functionality and in rendering and displaying the numerous user interfaces for such navigation.

In addition to improving efficiency, the video room system can also improve flexibility over many conventional digital communication systems. Particularly, as opposed to those conventional systems that require registration and/or user of a particular application to access a video call, the video room system can more flexibly facilitate video calls between different device types and across different software applications. Additionally, whereas some conventional systems are fixed to sharing links for video calls via limited messaging and email channels, the video room system can flexibly (and automatically) surface access to video rooms based on social networking information, in addition to various messaging channels. Further, in some embodiments, the video room system can automatically provide a video room link by adapting to specific behavior of the creator device—e.g., by providing a video room link for display within a particular chat interface from which a video room element was selected to generate the video room. Thus, not only does the video room system improve the flexibility of sharing video rooms, as compared to conventional systems, but the video room system also improves the discoverability of video rooms and further reduces the number of user interactions required such sharing.

Beyond the above-mentioned improvements, the video room system can further improve security over conventional digital communication systems. For instance, as opposed to conventional systems that allow unlimited and/or indiscriminate sharing of links or invites for video meetings, the video room system can limit sharing of a video room link. In particular, upon determining that a video room link has been shared with a threshold number of invitee devices, the video room system can limit the number of invitee devices that can be recipients of a single messaging containing a video room link. In some embodiments, the video room system further improves security of video rooms by limiting numbers of anonymous invitees (e.g., invitees without social media accounts) that can be invited to a video room (e.g., in total or within a single invite message).

Further relating to improved security, as opposed to conventional systems that either do not authenticate devices before allowing access to video calls or that employ a general security measure to authenticate all devices uniformly, the video room system can verify authenticity of different invitee devices using different authentication procedures. Indeed, based on whether or not particular invitee devices are registered with a social networking system (and/or with a particular application) and/or based on the entry point by which the invitee devices accessed the video room, the video room system can utilize different authentication procedures. To elaborate, for an invitee device whose user is a member of a particular social networking system (or for an invitee device requesting access via a link shared within a particular application), the video room system can access particular social networking data the user to verify authenticity and establish that the invitee device is trustworthy. For an invitee device whose user is not registered with the social networking application (or for an invitee device requesting access via a video room link shared outside of a particular application), on the other hand, the video room system can access different information such as browser data, a number of join attempts by the invitee device within a time period, and/or an IP address.

As indicated by the foregoing discussion, the present disclosure utilizes a variety of terms to describe features and advantages of the video room system. For example, as used herein, the term "video room" refers to a digital space, environment, or interface for participant devices to connect for transmission of audio and video information as part of a video chat. A video room further refers to a digital space (e.g., a uniform resource locator or "URL") maintained on one or more servers that, once created, remains open and available for access by a creator device and invitee devices (e.g., in a come-and-go fashion for at least a threshold period of time and in accordance with video room settings. A video room can facilitate video chatting between a threshold number (e.g., 50 or 100) of participant devices. A video room can remain open for a threshold period of time (without video room activity) or until a moderator device disables and/or locks the video room. Rather than being tied to the timeframe of a meeting or some other event, a video room can remain open for several days, weeks, or months, thereby allowing participant devices to come and go to and from the video room for impromptu interactions amongst them. In some embodiments, a video room is accessible by users of a social networking system and by users who are not associated with the social networking system, and by different types of client devices operating different applications (e.g., a second messaging application or a browser application).

Relatedly, the term "creator device" refers to a computing device associated with a creator user (e.g., a user that utilizes the creator device to initiate, organize, or create a video room). A creator device can also receive user input to distribute a video room link to provide access to a video room. Similarly, the term "invitee device" refers to a computing device associated with an invitee user (e.g., a user of a computing device that is permitted access to a video room created by a creator device). An invitee device can receive a video room link in one form or another and can join a video room based on user interaction with the video room link. For example, an invitee device can receive a video room link shared by a creator device or surfaced within a social networking feed (without express sharing by a creator device). Indeed, the video room system can determine that a particular user is invited (i.e., an invitee) based on factors other than express invitation from a creator (e.g., a connection within a social graph).

As mentioned, the video room system can integrate access to functionality associated with a second messaging application within a first messaging application. For example, a "first messaging application" can include a messaging application that is lightweight, smaller in size, secure, and/or that requires fewer computing resources to operate (as compared to a second messaging application). The first messaging application may not include functionality for generating a video room but can include functionality for chat messaging between devices, including end-to-end encryption of messages, and can further present graphical user interfaces that include video room elements for creating video rooms by accessing the second messaging application. In addition, the term "second messaging application" can refer to a heavier messaging application that includes more functionality than the first messaging application, including functionality for generating or creating a video room. In some embodiments, the second messaging application is associated with a social networking system and accesses social networking information (e.g., social graphs) associated with users to perform one or more functions.

As also mentioned, the video room system can generate a video room link to provide to invitee devices for access to a video room. As used herein, the term "video room link" refers to a link or a selectable user interface element that provides (or causes an invitee device to request) access to a particular video room upon user selection. A video room link can include information associated with a creator and/or a creator device, a name of a corresponding video room, and/or address information for the digital space of the video room. In some embodiments, a video room link can be a deep link that includes information to cause a computing device (e.g., an invitee device) to access or open a particular application upon selection of the video room link. For instance, a video room link can cause an invitee device to determine whether a second messaging application is installed and to open the second messaging application (or a browser application if the second messaging application is not installed) to access a video room. A video room link can have different configurations depending on where and/or with whom the video room link is shared (e.g., via text message to an anonymous user or within a social networking application to a known co-user) and can thereby cause a device to perform different functions upon its selection.

Additionally, the video room system can generate and provide a video room element within a graphical user interface of a first messaging application. As used herein, the term "video room element" refers to a selectable user interface element for generating or creating a video room. In some embodiments, the video room element is a deep link that causes the video room system to perform certain functions upon selection. Indeed, upon selection of a video room element displayed within a graphical user interface of the first messaging application, the video room system can determine whether the second messaging application is installed on the creator device and access functions of the second messaging application to generate a video room. Based on determining whether a second messaging application is installed on the creator device, the video room system can select between the second messaging application and a browser application to generate a video room link.

If the second messaging application is not installed, selection of the video room element can cause the video room system to access a browser application with capabilities to generate a video room (e.g., via a video room creation website). In some embodiments, a video room element includes location information indicating a particular user interface where the video room element is displayed. Thus, the video room system can access the location information for a video room element to determine how to distribute a video room link for the generated video room (e.g., within a particular chat interface if the selected video room element was in a location within the chat interface or within a menu of the chat interface).

In one or more embodiments, the video room system can determine connections within a social graph between a user and co-users of a social networking system. As used herein, the term "co-user" refers to a user associated with a social networking system. A co-user refers to a user who is registered with a social networking system (e.g., who has a user account within the social networking system) and whose relationship or connection with another co-user can be determined via a social graph and/or user interactions within one or more applications such as the second messaging application or a social networking application.

As used herein, the term "browser application" refers to an application operable to access and interact with websites via the Internet. For example, a browser application can communicate with servers to access online spaces or addresses to view and interact with content such as digital images, text, and/or digital video. In some cases, a browser application can access particular websites that facilitate communication between devices to generate and distribute messages including text, digital images, digital videos, and/or video room links.

Additional detail regarding the video room system will now be provided with reference to the figures. For example, FIG. 1 illustrates a schematic diagram of an example environment for implementing a video room system 102 in accordance with one or more embodiments. An overview of the video room system 102 is described in relation to FIG. 1. Thereafter, a more detailed description of the components and processes of the video room system 102 is provided in relation to the subsequent figures.

As shown in FIG. 1, the environment includes server(s) 106, a creator device 108, invitee devices 114a-114n, and a network 116. Each of the components of the environment can communicate via the network 116, and the network 116 may be any suitable network over which computing devices can communicate. Example networks are discussed in more detail below in relation to FIGS. 20 and 21.

As mentioned, the environment includes a creator device 108. The creator device 108 can be one of a variety of computing devices, including a smartphone, a tablet, a smart television, a desktop computer, a laptop computer, a virtual reality device, an augmented reality device, or some other computing device as described in relation to FIGS. 20 and 21. The creator device 108 can receive user input from a user in the form of user actions such as touch gestures, clicks, etc., in relation to user interface elements displayed as part of the first messaging application 110 and/or the second messaging application 112 (or a social networking application). In some embodiments, the creator device 108 is associated with a user of the social networking system 104, where the user has a social media account or is registered with the social networking system 104. The creator device 108 can also provide information pertaining to user input to the server(s) 106. Thus, the video room system 102 on the server(s) 106 can receive user input information from the creator device 108 to indicate actions within the first messaging application 110 for sending messages, selecting a video room element to create a video room, sharing or distributing a video room link within a chat interface, or navigating within the first messaging application 110.

As also mentioned, the environment includes invitee devices 114a-114n. In particular, the invitee devices 114a-114n, like the creator device 108, can be one of a variety of computing devices, including a smartphone, a tablet, a smart television, a desktop computer, a laptop computer, a virtual reality device, an augmented reality device, or some other computing device as described in relation to FIGS. 20 and 21. The invitee devices 114a can be associated with an invitee that has a profile within the social networking system 104, while the invitee device 114n can be associated with an invitee that does not have an account or a profile within the social networking system 104. In addition, the invitee devices 114a-114n can receive input from invitees in relation to user interface elements displayed within the first messaging application 110 or the second messaging application 112. For example, the invitee devices 114a-114n can receive input to select a video room link to join a video room, and/or receive input to leave a video room, invite someone to join a video room, send a message, and/or to navigate within the first messaging application 110 or the second messaging application 112 via touch gestures, clicks, etc. The invitee devices 114a-114n can further communicate with the server(s) 106 to provide input information to the video room system 102.

As shown, the creator device 108 and the invitee devices 114a-114n include a first messaging application 110 and a second messaging application 112. In some embodiments, however, the invitee device 114n does not include the second messaging application 112 and may not be associated with the social networking system 104 but may instead join a video room via a separate application such as a browser application. The first messaging application 110 and/or the second messaging application 112 may be a web application, a native application installed on the creator device 108 and/or the invitee device 114 (e.g., a mobile application, a desktop application, a web-based browser application, etc.), or a cloud-based application where all or part of the functionality is performed by the server(s) 106. The first messaging application 110 and the second messaging application 112 can have different functionality and can communicate by sending data back and forth. For example, the first messaging application 110 can be a smaller, lighter application meant primarily for chats or other messaging, while the second messaging application 112 can be a larger application with more functionality including messaging, calling, and facilitating video rooms for video conversations. In some embodiments, the creator device 108 and/or an invitee device (e.g., the invitee device 114a or 114n) includes additional applications such as a social networking application that presents a social networking interface including an activity feed, a newsfeed, a friend's interface, and/or a message thread.

The first messaging application 110 and the second messaging application 112 can present or display information to a user such as a creator or an invitee, including a messaging interface. In some embodiments, the first messaging application 110 provides a video room element for a creator to navigate to the second messaging application 112 to create a video room. The second messaging application 112, in turn, presents selectable options to generate a video room and to set various preferences or settings associated with a video room. In addition, the second messaging application 112 includes functions to facilitate or manage the video room for the creator device 108 and the invitee devices 114a-114n to video chat together. The first messaging application 110 also generates a data packet indicating a particular location such as a chat thread and/or a particular location within a chat thread so that, after returning from creating a video room within the second messaging application 112, the first messaging application 110 can display the same chat thread and/or location with a chat thread.

As illustrated in FIG. 1, the environment includes the server(s) 106. The server(s) 106 may generate, store, process, receive, and transmit electronic data, such as creator profile information, invitee profile information, other social media account information, video room information, user interaction information, affinity information, and user inputs. For example, the server(s) 106 can transmit data to the creator device 108 to provide a video room interface via the second messaging application 112 and/or chat interface via the first messaging application 110. In some embodiments, the server(s) 106 comprises a content server. The server(s) 106 can also comprise an application server, a communication server, a web-hosting server, a social networking server, a video communication server, or a digital communication management server.

As shown in FIG. 1, the server(s) 106 can also include the video room system 102 (e.g., implemented as part of a social networking system 104). The social networking system 104 can communicate with the creator device 108 and/or the invitee devices 114a-114n. Although FIG. 1 depicts the video room system 102 located on the server(s) 106, in some embodiments, the video room system 102 may be implemented by (e.g., located entirely or in part) on one or more other components of the environment. For example, the video room system 102 may be implemented by the invitee device 114, the creator device 108, and/or a third-party device.

In some embodiments, though not illustrated in FIG. 1, the environment may have a different arrangement of components and/or may have a different number or set of components altogether. For example, the invitee device 114 and/or the creator device 108 may communicate directly with the video room system 102, bypassing the network 116. Additionally, the video room system 102 can include one or more databases (e.g., a social media account database) housed on the server(s) 106 or elsewhere in the environment. In some embodiments, all or part of the video room system 102 can be located on, and implemented by, different devices within the environment. For example, the video room system 102 can be implemented by one or more of the server(s) 106, the creator device 108, and/or the invitee devices 114a-114n.

Figure 2:
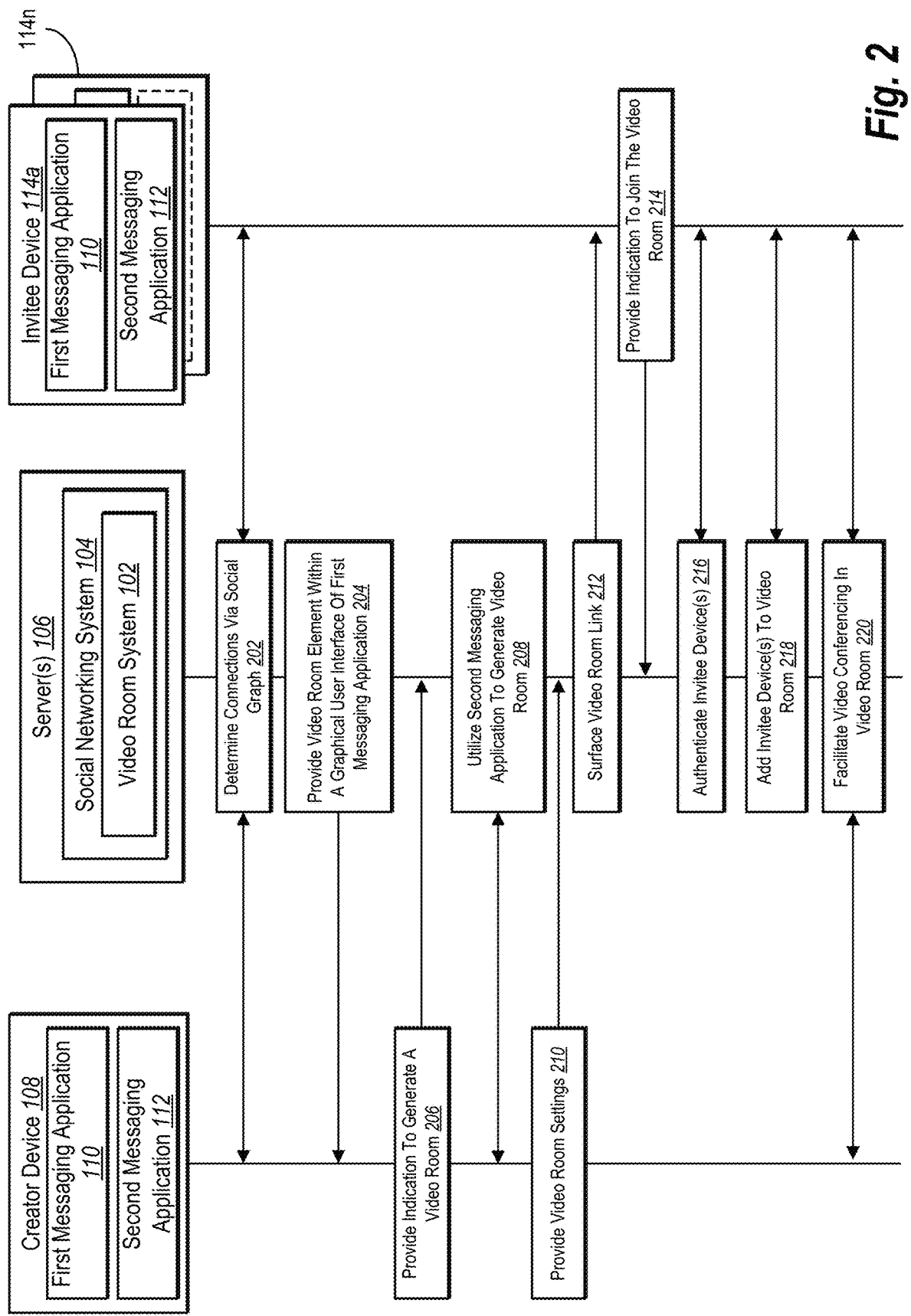
FIG. 2 illustrates an example sequence flow of the video room system generating and distribution a video room link for a video room in accordance with one or more embodiments.

As mentioned, the video room system 102 can generate and facilitate a video room for video conferencing between a creator device (e.g., the creator device 108) and one or more invitee devices (e.g., the invitee devices 114a-114n) by utilizing functions of the second messaging application 112 via user interaction with the first messaging application 110. FIG. 2 illustrates a sequence flow diagram including acts performed by the creator device 108, the video room system 102, and the invitee devices 114a-114n for cross-application generation of a video room in accordance with one or more embodiments.

As shown in FIG. 2, the video room system 102 performs an act 202 to determine connections between users via a social graph. In particular, the video room system 102 determines connections between a creator and an invitee who are co-users of the social networking system 104, as indicated by an affinity (and an associated magnitude or measure of affinity as indicated by an affinity coefficient, as described in relation to FIGS. 21-22). For example, the video room system 102 determines a closeness between a creator and an invitee based on interactions (e.g., messaging, tagging, posts from one that mention the other) between them as well as a number of degrees of separation within a social graph (e.g., friends or friends of friends). In some embodiments, the video room system 102 determines connections such as friends of a creator, followers of a creator, and/or co-users that the creator follows.

To determine connections between users, per device settings, the video room system 102 monitors actions associated with the creator device 108 and the invitee devices 114a-114n within a social networking application or a messaging application associated with the social networking system 104 (e.g., the second messaging application 112). For instance, the video room system 102 identifies messages (e.g., a number of messages or a frequency of messages) between the creator device 108 and the invitee device 114a via the second messaging application 112 that indicate a connection between users. Based on the social graph of the creator, the video room system 102 further determines whether the creator and one or more of the invitees are friends (or friends of friends) within the social networking system 104.

As further shown, the video room system 102 performs an act 204 to provide a video room element within a graphical user interface of the first messaging application 110. In particular, the video room system 102 provides a video room element within an interface such as a video call list interface, a chat interface, or a new call interface of the first messaging application 110. The video room system 102 thus provides video room elements for display on the creator device 108 within one or more user interfaces as different entry points for creating a video room.

In some embodiments, the first messaging application 110 includes functionality for initiating group calls between multiple devices. For example, the video room system 102 replaces a group call element with a video room element within the chat interface of the first messaging application 110.

In certain embodiments, the video room system 102 determines to provide the video room element as part of the first messaging application 110 based on various factors. For instance, the video room system 102 provides a video room element based on a number of participants (or participant devices) in a chat or a number of invitees (or invitee devices) for a group call. In some cases, the video room system 102 determines that a number of invitees (or invitee devices) invited to a group call exceeds a threshold number (e.g., 8 or 10). In these cases, based on this determination, the video room system 102 provides a video room element in place of a group call element for display within the first messaging application 110. For example, if there are six participants (e.g., the creator device and five invitee devices) in a chat with a threshold of five, then the video room system 102 replaces a group call element with a video room element within the chat interface. Thus, in these embodiments, the creator can initiate a video room and can invite the participants of the chat to the video room. Additional detail regarding locations and placement of video room elements within graphical user interfaces is provided below with reference to subsequent figures.

As further illustrated in FIG. 2, the creator device 108 performs an act 206 to provide an indication to generate a video room to the video room system 102. For example, the creator device 108 detects a user interaction selecting a video room element from within a user interface of the first messaging application 110 and provides an indication to the video room system 102 indicating the selection of the video room element, including an identifier and/or location of the video room element. Thus, the video room system 102 receives an indication to generate a video room from the creator device 108. Based on receiving the indication to generate a video room, the video room system 102 determines a location of and/or identity of the selected video room element. As a result, upon completion of generating and/or participating in a video room, the video room system 102 can return the creator to the same location within the first messaging application 110 (e.g., by displaying the same chat interface or the same location within a chat interface).

As shown, the video room system 102 further performs an act 208 to utilize the second messaging application 112 to generate a video room. In particular, the video room system 102 accesses functions (e.g., APIs) associated with the second messaging application for generating a video room. The video room system 102 accesses the particular video-room-generation functions associated with the second messaging application 112 in response to receiving the indication to generate a video room (e.g., from a user selection of a video room element). For instance, the video room system 102 redirects or hands off from first messaging application 110 to the second messaging application 112 to generate a video room. Indeed, the video room system 102 determines that the second messaging application 112 is installed on the creator device 108 and provides a prompt requesting permission to access the second messaging application 112.

In addition to generating the video room itself, the video room system 102 also generates a video room link for accessing the video room. In particular, the video room system 102 generates a secure video room link by including a hash or a token within the video room link that prevents unwanted users from joining a video room. For example, the video room system 102 generates a link hash having a particular number of characters (e.g., 16 characters) and that satisfies an entropy threshold.

In addition, the video room system 102 configures a video room link differently for different invitee devices (e.g., a different video room link for the invitee device 114a relative to the invitee device 114n). To elaborate, the video room system 102 configures a video room link for the invitee device 114n not associated with an account within the social networking system 104 (and/or joining a video room via a browser unaffiliated with the first messaging application 110) differently than for an invitee device 114a associated with an account within the social networking system 104 (and/or joining the video room via the second messaging application 112). For example, the video room system 102 configures a video room link for invitee device 114a by including social networking system information for the video room link. On the other hand, the video room system 102 configures a video room link for the invitee device 114n (or an invitee device associated with an anonymous user) by generating a link hash that includes a number (e.g., 16) of characters and that satisfies a threshold level of entropy such that it is statistically unlikely that a computer can guess the link hash over a period of time (e.g., 100 years).

Based on confirmation from the creator device 108, the video room system 102 generates a video room, assigns the creator device 108 as the administrator (e.g., the user who controls settings) of the video room, and provides a video room settings interface for display on the creator device 108 as part of the second messaging application 112. Indeed, as shown in FIG. 2, the creator device 108 performs an act 210 to provide video room settings. In particular, the creator device 108 receives input from the creator within a video room settings interface to set video room settings. Thus, the video room system 102 receives the video room settings from the creator device. From the video room settings interface, the video room system 102 receives indications of user input for various video room settings including locking and unlocking the video room, setting a limit to the number of participants in the video room, sharing a link to the video room, leaving the video room (e.g., leaving the video room while still leaving the video room open for other participants/invitees), ending the video room (e.g., removing all participants/invitees and disabling the video room link), and seeing which participants are currently in the video room.

In some embodiments, the video room system 102 determines when or if the creator device 108 leaves a video room and restricts entrance to the video room accordingly. Based on determining that the creator device 108 leaves the video room, the video room system 102 locks the video room to prevent additional invitee devices from joining the video room. In some cases, after the creator device 108 leave the video room, the video room system 102 allows the invitee devices already in the video room to remain and continue video conferencing. In one or more embodiments, the video room system 102 further notifies invitee devices within the video room that the creator device 108 left the video room and further notifies the invitee devices if the creator device 108 returns to the video room. Upon return of the creator device 108, the video room system 102 enables additional invitee devices to join the video room.

As further illustrated in FIG. 2, the video room system 102 performs an act 212 to surface a video room link. In particular, the video room system 102 provides the video room link to one or more invitee devices 114a-114n in response to sharing by the creator device 108 and/or automatically without prompting by the creator device 108. For example, the video room system 102 automatically (e.g., without user input from the creator) surfaces a video room link within a social networking feed (e.g., a newsfeed or a messaging feed) of an invitee that is a co-user of the social networking system 104. Indeed, based on connections determined in the act 202 (e.g., based on an affinity or a relationship between the creator and the co-user invitee) the video room system 102 determines that the affinity between the creator and the co-user invitee satisfies a threshold affinity and provides the video room link within a social networking feed of the co-user invitee.

In some embodiments, the video room system 102 determines how to provide a video room link to an invitee device based on information associated with a video room element that was selected to generate the video room in the first place. To elaborate, the video room system 102 determines a location associated with the video room element that was selected to generate the video room such as a location within a particular user interface or menu of the first messaging application 110. For instance, if the video room system 102 determines that the selected video room element was within a menu of a particular chat, then the video room system 102 determines to automatically provide the video room link within the chat thread upon generating the video room. However, if the video room system 102 determines that the selected video room element was within a new call interface or a video call list interface of the first messaging application 110, then the video room system 102 determines to provide options (e.g., a chat selection interface or an invitee selection interface) for the creator to select which of the invitee devices 114a-114n to provide with the video room link.

In one or more embodiments, the video room system 102 determines whether an invitee is registered with the social networking system 104 as part of determining how to surface the video room link. In addition, the video room system 102 determines whether an invitee is registered with the second messaging application 112. For instance, if the video room system 102 determines that an invitee is registered with both the social networking system 104 and the second messaging application 112, then the video room system 102 surfaces the video room link within a user interface of the second messaging application 112 (e.g., within a discovery pane of a chats interface). If, on the other hand, the video room system 102 determines that an invitee is registered with the social networking system 104 but not with the second messaging application 112, then the video room system 102 surfaces the video room link within a social networking feed (and/or within a discovery pane of a user interface within a social networking application) of the invitee, provided the invitee also has a threshold affinity with respect to the creator. The video room system 102 thus improves the flexibility and the discoverability of a video room as compared to conventional systems that rely solely on express sharing of links for video meetings. However, the video room system 102 also enables the creator device 108 to share the video room link via text messages, emails, and other messaging systems.

As mentioned, the video room system 102 automatically surfaces a video room link to certain invitees based on social graph information (e.g., to friends within the social networking system or other users within a threshold closeness/affinity to the creator). In some embodiments, the video room system 102 surfaces a video room link based on a number of degrees of separation (e.g., only to friends of the creator, friends of friends of the creator, and/or friends of an invitee who joins a video room). The video room system 102 further determines other factors for automatically surfacing a video room link such as a number of users within a video room (e.g., to refrain from automatically surfacing if the video room is full or to select only those with the strongest affinity for a video room with a limited capacity).

In accordance with device settings and per area regulations, the video room system 102 further determines additional factors for automatically surfacing a video room link, including a recency of an invitee's participation in the same video room (or a different video room), a number of people in a lobby for the video room, a lock status of the video room, platform restrictions on which applications are allowed to access the video room, and latencies of the invitee devices 114a-114n. For instance, the video room system 102 is less likely to provide the video room link to an invitee device with high latency and/or if the invitee associated with the invitee device has previously been invited to video rooms but has never joined. In some embodiments, the video room system 102 generates a ranked list of the invitee devices 114a-114n and automatically surfaces the video room link to a threshold number of top-ranked invitee devices. For example, the video room system 102 generates the ranked list based on social graph information, user interactions, and the other above-mentioned factors (e.g., by scoring each invitee using a weighted combination of the factors and comparing the scores).

In one or more embodiments, the video room system 102 utilizes a machine learning model (e.g., a neural network) to determine which invitee devices to surface a video room link. For instance, the video room system 102 utilizes a machine learning model trained to predict which invitee devices would join a video room given a video room link. In some cases, the video room system 102 inputs information into the machine learning model, such as affinity information between user accounts, recencies of participation in the same video room (or a different video room), a number of people in a lobby for the video room, a lock status of the video room, platform restrictions on which applications are allowed to access the video room, and/or latencies of invitee devices. In turn, the machine learning model generates a prediction of whether or not the invitee device would join a video room (or predicts a probability or a likelihood of joining the video room). The video room system 102 thus provides a video room link to invitee devices predicted to join the video room (or whose join probability satisfies a threshold join probability).

In one or more embodiments, the video room system 102 ranks video rooms to determine which video rooms to surface to an invitee device (e.g., the invitee device 114a). For example, the video room system 102 identifies a plurality of video rooms that could be surfaced to the invitee device 114a based on the above factors (e.g., video rooms that are created by friends or other connections of the invitee). The video room system 102 ranks the video rooms based on factors such as a recency of creation of the video room, a number of participants in the video room, a connection to the creator, and/or connections to other participants in the video room. From the ranked list of video rooms, the video room system 102 identifies a number (e.g., 1 or 3) of top-ranked video room links to surface for display on the invitee device 114a (e.g., within a social networking feed).

In some embodiments, the video room system 102 limits the number of times that a given video room link can be shared or forwarded. For example, the video room system 102 limits a video room link to 5 total shares or forwards (e.g., by a single device or cumulatively across all devices that share the link). In these or other embodiments, the video room system 102 modifies a video room link based on a number of shares associated with the video room link. For example, the video room system 102 reduces a number of same-time recipients for a given video room link (e.g., a video room link can be sent to a limited number of recipients in a single message). To elaborate, once the video room system 102 determines that a video room link has been shared a threshold number of times, the video room system 102 limits the number of same-time recipients for the video room link (e.g., invitee devices with whom the video room link can be shared at one time or via a single message). Thus, at the outset, a new video room link may be sharable to up to five invitee devices at a time, whereas a video room link that has been shared a threshold number of times may be limited to a single invitee device per message.

As illustrated in FIG. 2, the invitee devices 114a-114n perform an act 214 to provide an indication to join the video room. In particular, the invitee devices 114a-114n provide indications of user selections of video room links to join a video room. In some embodiments, the invitee device 114a provides a different indication than the invitee device 114n. For instance, the invitee device 114a provides an indication of a selection of a video room link configured to access the second messaging application 112 to join the video room, while the invitee device 114n provides an indication of a selection of a video room link configured to access a browser application to join the video room. Indeed, as described, the video room system 102 configures a video room link differently for different invitee devices based on whether the invitee devices are associated with the second messaging application 112 (or with the social networking system 104). Thus, the video room system 102 receives the indication(s) or the request(s) to join the video room from the invitee devices 114a-114n based on user selection(s) of the video room link.

In addition, the video room system 102 monitors join attempts by the invitee devices 114a-114n. More specifically, the video room system 102 determines a number of join attempts for a particular invitee device (e.g., the invitee device 114a) and slows down the experience for the invitee device 114a if the invitee device 114a exceeds a threshold number of join attempts within a time period. For example, the video room system 102 throttles processing of user interactions and/or presentation of various user interface elements to slow down the user experience of the invitee device 114*a* if the invitee device 114*a* exceeds a threshold number of join attempts. In some cases, the video room system 102 increases response time for the invitee device 114*a* to slow down the experience. In some embodiments, the video room system 102 prevents new join attempts by the invitee device 114*a* for an interval of time. Thus, by penalizing invitee devices with excessive join attempts (and by using high-entropy link hashes), the video room system 102 prevents bots or unwanted users from joining a video room through brute force guesses or hacking of a video room link.

In one or more embodiments, the video room system 102 also receives an indication to join the video room from the creator device 108. Indeed, in some cases, such as in response to a creator selection of a video room element to create a video room from a particular interface, the video room system 102 automatically adds the creator device 108 to the video room without further input from the creator. In other cases, however, such as in response to a creator selection of a video room element from a different interface, the video room system 102 generates the video room but does not add the creator device 108 to the video room. Instead, the video room system 102 provides a video room link to the creator device 108 and requires user interaction from the creator to select the video room link to then add the creator device 108 to the video room.

As also illustrated in FIG. 2, the video room system 102 performs an act 216 to authenticate invite device(s). In particular, the video room system 102 performs the act 216 based on receiving the indication(s) of user selections (via the invitee devices) to join a video room. As mentioned above, the video room system 102 performs different authentication procedures for different invitee devices. For instance, the video room system 102 authenticates different invitee devices differently based on factors such as whether or not invitee devices (or the corresponding invitees) are associated with the second messaging application 112 and/or the social networking system 104. Other authentication factors include whether the invitee devices request to join a video room via an anonymous video room link (e.g., a video room link shared outside of the first messaging application 110, the second messaging application 112, and the social networking system 104) or trustworthiness scores of the invitee devices.

Indeed, depending on the authentication factors associated with invitee devices, the video room system 102 can access more or less information for users associated with the invitee devices. For example, the video room system 102 can access information from social networking accounts within the social networking system 104 to verify the authenticity of users (e.g., by ensuring that they are not bots). Particularly, the video room system 102 verifies users based on various social networking information such as an age of an account, an interaction history, and/or a social graph that indicates relationships with other verified/authentic users.

In some embodiments, the video room system 102 accesses different information (or a different amount of information) or invitee devices not associated with the social networking system 104. For instance, the video room system 102 authenticates an invitee device by accessing information such as browser data (including an IP address of the invitee device), a number of join attempts with a threshold period of time, and/or an identification cookie associated with the invitee device. In certain cases, the video room system 102 accesses the same or different information for invitee devices that request to join video rooms via video room links shared via text message, email, or other entry points outside of the social networking system 104. Additional detail regarding authenticating invitee devices is provided below with reference to subsequent figures.

As shown in FIG. 2, the video room system 102 performs an act 218 to add invitee device(s) to a video room. In particular, the video room system 102 adds authenticated invitee devices (e.g., invitee devices 114*a*-114*n*) to the video room (or to a video room lobby) and prevents un-authenticated invitee devices from accessing the video room. The video room system 102 adds invitee devices to the video room by granting access to the video room (e.g., the URL) and permitting the invitee devices to participate in video conferencing within the video room.

In some embodiments, the video room system 102 notifies user accounts of join attempts by blocked user accounts. To elaborate, the video room system 102 determines or identifies user accounts blocked by a particular invitee device (e.g., the invitee device 114*a*) or by a particular user account. Upon detecting that a blocked user account requests permission to access a video room or otherwise attempts to join a video room where the invitee device 114*a* has already joined, the video room system 102 provides an indication to the invitee device 114*a* (or other participant devices) that a blocked user account is attempting to join the video room. Thus, the invitee device 114*a* can exit or terminate access to the video room to avoid contact with the blocked user account. In some cases, the video room system 102 notifies both the blocked user account and the user account that blocked the other user, while in other cases the video room system 102 notifies only the user account blocked the other user account.

In one or more embodiments, the video room system 102 adds an invitee device associated with a blocked user account to a video room lobby to wait for the invitee device of the blocking user account to leave. Indeed, in some cases, the video room system 102 generates and maintains a video room lobby for a particular video room. The video room system 102 determines which invitee devices to add to the video room lobby, which invitee devices to add to a video room from a video room lobby, which invitee devices to add directly to a video room without first being put in a video room lobby, and when to do any of the above.

In some cases, the video room system 102 generates a video room lobby specific to a particular video room. Upon receiving join requests from invitee devices to join the video room, the video room system 102 determines which invitee devices to add directly to the video room and which invitee devices to add to the video room lobby. For example, the video room system 102 adds a threshold number of invitee devices directly to the video room and adds any additional invitee devices to a video room lobby. In some embodiments, the video room system 102 selects invitee devices joining via a link expressly shared by the creator device 108 to add directly to the video room. In other embodiments, the video room system 102 selects a threshold number of invitee devices associated with user accounts that have highest affinity scores relative to the creator user account to add directly to the video room.

The video room system 102 adds invitee devices joining via other links (e.g., links not expressly shared to the invitee devices) to a video room lobby. Additionally, the video room system 102 adds invitee devices associated with user accounts that have lower (e.g., lower than a threshold) affinities relative to the creator user account to the video room lobby. In some cases, the video room system 102 adds invitee devices with lower trustworthiness scores to a video room lobby. In these or other cases, the video room system 102 adds invitee devices joining via a link shared by a user account other than the creator user account to a video room lobby.

In one or more embodiments, the video room system 102 adds invitee devices to a video room from a video room lobby. For instance, if the threshold number of invitee devices for the video room has not been met, the video room system 102 selects invitee devices from the video room lobby to add to the video room (e.g., up to the threshold number). In certain cases, the video room system 102 automatically (e.g., without user input) selects invitee devices to add to the video room from the video room lobby by, for instance, selecting invitee devices associated with user accounts with highest affinities (from among those in the video room lobby) relative to the creator user account. In at least one embodiment, the video room system 102 receives user interaction from the client device 108 selecting one or more invitee devices to add to the video room from the video room lobby (e.g., from within a video room lobby interface).

Additionally, the video room system 102 performs an act 220 to facilitate video conferencing in the video room. More specifically, the video room system 102 receives data such as video and audio streams from client devices such as the creator device 108 and the invitee devices 114a-114n. The video room system 102 further provides the video and audio data from the creator device 108 to the invitee devices 114a-114n and provides the video and audio data from the invitee devices 114a-114n to the creator device 108 and to the other invitee devices 114a-114n.

In some embodiments, the creator device 108 controls the video room. For example, the video room system 102 limits the number of participants that can be in a video room at a time in accordance with video room settings set by the creator device 108. If the number is met, the video room system 102 can add any additional invitee devices requesting to join the video room to a lobby associated with the video room. Upon detecting that an invitee device leaves the video room, the video room system 102 can add a new invitee device (e.g., the invitee device who has been in the lobby the longest and/or with the closest connection/affinity to the creator) to the video room.

As mentioned, the video room system 102 keeps the video room open (and keeps the video room link valid and functional) for a threshold period of time (e.g., 4 hours, 1 hour, or 30 minutes) until the video room expires or until the creator device 108 disables the video room link. Indeed, the video room system 102 keeps a video room link active even with no users are in the video room up to the threshold period of time. Thus, invitee devices 114a-114n can come and go freely to and from the video room (unless the room is locked, in which case invitee devices 114a-114n can leave but not join). In one or more embodiments, the video room system 102 persistently maintains a video room for a period of days, weeks, or months without tying the video room to a particular meeting or event.

Figure 3:
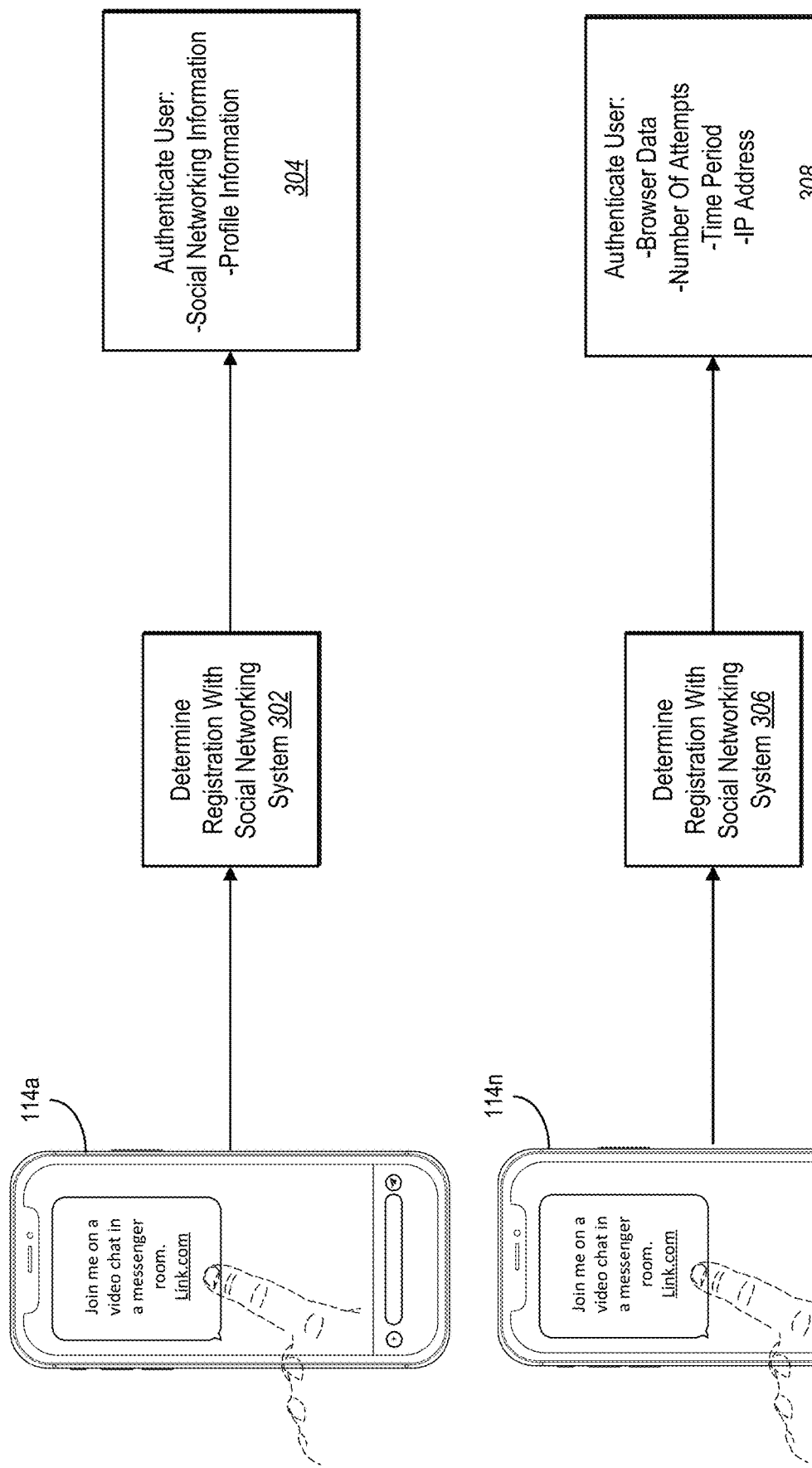
FIG. 3 illustrates an example series of acts for authenticating invitee devices in accordance with one or more embodiments.

As further mentioned above, the video room system 102 can authenticate invitee devices requesting to join a video room. In particular, the video room system 102 can utilize different authentication procedures for invitee devices joining via different video room links and/or that are associated with invitees who do or do not have accounts within the social networking system 104. FIG. 3 illustrates authenticating the invitee device 114a using a first authentication procedure and authenticating the invitee device 114n using a second authentication procedure in accordance with one or more embodiments.

As illustrated in FIG. 3, the video room system 102 receives an indication of a user selection of a video room link from the invitee device 114a. Based on receiving the indication of the user selection of the video room link (or the request to join the video room), the video room system 102 further performs an act 302 to determine registration of the corresponding invitee with the social networking system 104. In some embodiments, the video room system 102 determines registration of the invitee with the second messaging application 112 in addition (or alternatively) to determining registration with the social networking system 104. In the same or other embodiments, the video room system 102 determines a configuration of a video room link by which the invitee device 114a is requesting to join the video room. For example, the video room system 102 determines whether the video room link was surfaced within a chat of the first messaging application 110, within the second messaging application 112, within a social networking feed, or provided within a text message or an email.

In one or more embodiments, the video room system 102 treats video room links surface in different applications differently. For instance, the video room system 102 prioritizes join attempts by invitee devices based on selections of the video room links surfaced in different applications. In some cases, the video room system 102 adds invitee devices joining via a video room link within a chat of the first messaging application 110 to the video room first. The video room system 102 also adds invitee devices joining via a video room link within chat within the second messaging application 112 next, followed by invitee devices joining via a video room link surfaced in a social networking feed, then by invitee devices joining via video room links within text messages or emails. In certain cases, if the number of invitee devices attempting to join the video room exceeds a threshold number of invitee devices for the video room, the video room system 102 denies entry to one or more invitee devices based on priority.

Based on determining that the invitee associated with the invitee device 114a is registered with the social networking system and/or the second messaging application 112 (and/or based on determining that the video room link was surfaced within the second messaging application 112 or a social networking feed), the video room system 102 performs an act 304 to authenticate the invitee device 114a using a first authentication procedure. For instance, the video room system 102 analyzes social networking information such as connections between the invitee and co-users of the social networking system 104 (e.g., connections between trusted co-users and untrusted co-users and behavior information within the social networking system 104). In addition, the video room system 102 analyzes profile information such as an age of a social networking account or profile and a completeness of a profile as part of the authentication procedure.

As shown in FIG. 3, the video room system 102 further receives an indication of a user selection of a video room link from the invitee device 114n. Based on receiving the indication of the user selection of the video room link (or the request to join the video room), the video room system 102 further performs an act 306 to determine registration of the corresponding invitee with the social networking system 104. In some embodiments, the video room system 102 determines registration of the invitee with the second messaging application 112 in addition (or alternatively) to determining registration with the social networking system 104. In the same or other embodiments, the video room system 102 determines a configuration of a video room link by which the invitee device 114n is requesting to join the video room. For example, the video room system 102 determines whether the video room link was surfaced within a chat of the first messaging application 110, within the second messaging application 112, within a social networking feed, or provided within a text message or an email.

As shown, the video room system 102 further performs an act 308 to authenticate the invitee device 114n (or the invitee) based on determining that the invitee device 114n is not registered with the social networking system 104 (or with the second messaging application 112). Indeed, the video room system 102 determines that additional information is necessary to authenticate the invitee device 114n based on the invitee device 114n not being associated with the social networking system 104 (and therefore not having readily available social networking information). Thus, the video room system 102 performs a different authentication procedure to access information such as browser data (e.g., one or more cookies), a total number of join attempts received from the invitee device 114n, a number of join attempts in a given time period, and an IP address of the invitee device 114n. In some embodiments, the video room system 102 access all or some of this information to perform an authentication procedure. The video room system 102 performs more in-depth authentication procedures (e.g., by accessing more information) for anonymous devices (e.g., devices that are not invited but otherwise try to join a video room).

As part of the authentication procedure, in some embodiments, the video room system 102 determines a trustworthiness score for an such as the invitee device 114a and the invitee device 114n (or for the corresponding invitees). For example, the video room system 102 determines a trustworthiness score to indicate a measure of trustworthiness, as determined based on the analyzed information (e.g., associated with the act 304 or 308). If the video room system 102 determines that the trustworthiness score satisfies a threshold, then the video room system 102 determines that the invitee device (or the invitee) is authentic or valid and can join the video room. If the video room system 102 determines that the trustworthiness score does not satisfy the threshold, on the other hand, then the video room system 102 determines that the invitee device (or the invitee) is not authentic and cannot join the video room.

In some embodiments, not only does the video room system 102 use different authentication procedures for different invitee devices (e.g., the invitee devices 114a and 114n), but the video room system 102 uses different authentication procedure for different applications as well. For instance, the first messaging application 110 and the second messaging application 112 do not necessarily share the same way of identifying and/or authenticating users. In some cases, the video room system 102 authenticates a first user of the first messaging application 110 using a first authentication procedure (e.g., the act 308) and authenticates a second user of the second messaging application using a second authentication procedure (e.g., the act 304).

Figure 4:
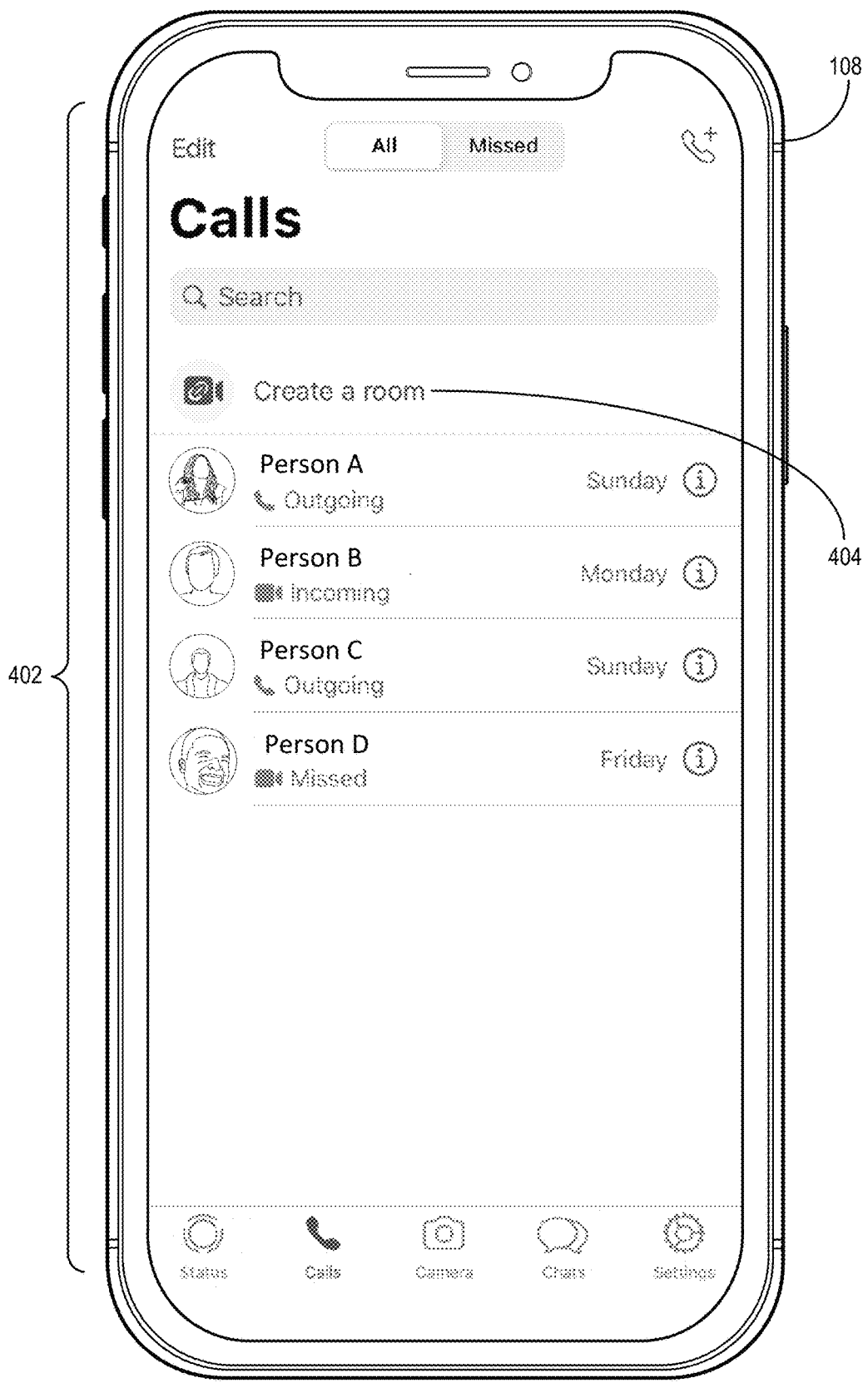
FIG. 4 illustrates an example call interface of a first messaging application in accordance with one or more embodiments.

As mentioned above, the video room system 102 can provide entry points within a user interface of the first messaging application 110 to generate a video room (via functions of the second messaging application 112). Indeed, for an entry point to generate a video room, the video room system 102 can provide a video room element within a user interface of the first messaging application 110. FIG. 4 illustrates the creator device 108 displaying a calls interface 402 including a video room element 404 in accordance with one or more embodiments.

As shown in FIG. 4, the video room system 102 provides (or display) the calls interface 402 of the first messaging application 110 in response to user interaction with a calls element (as shown by the phone-shaped icon near the bottom of the user interface). FIG. 4 illustrates the calls element within a navigation menu including various navigation options such as a status element to view a status interface, a calls element to view the calls interface 402, a camera element to view a camera interface, a chats element to view a chat menu interface, and a settings element to enter a settings interface.

In some embodiments, the video room system 102 provides a call history for display within the calls interface 402. Within the calls interface 402, the video room system 102 provides a video room element 404 selectable to create a video room. Based on user selection of the video room element 404, the video room system 102 accesses (functions of) the second messaging application 112 to generate the video room. In some embodiments, the video room system 102 access the second messaging application further based on determining that the first messaging application 110 does not have the capability to generate a video room and determining that the creator device 108 has the second messaging application 112 installed with a version that is capable of generating a video room.

Figure 5:
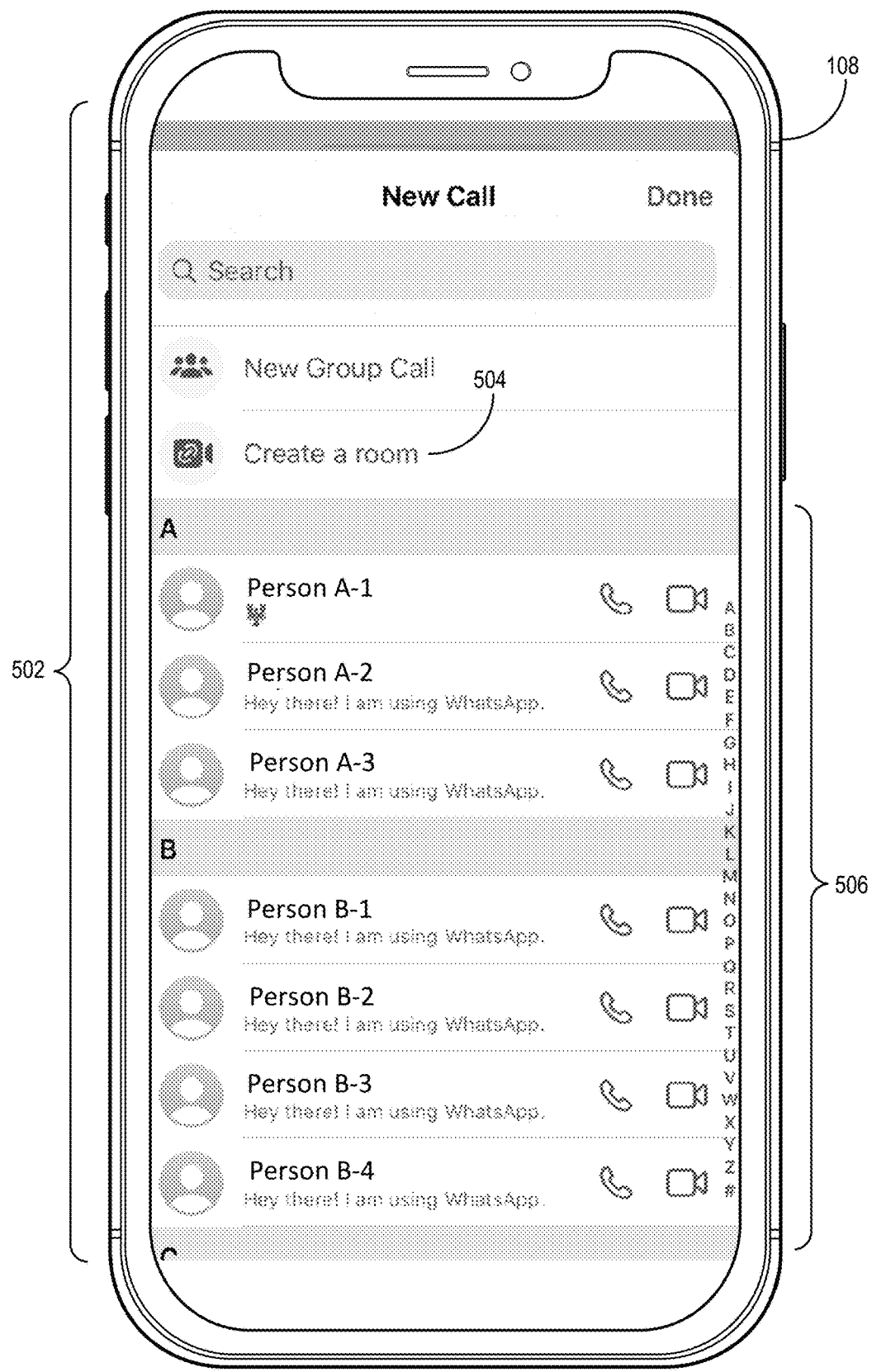
FIG. 5 illustrates an example new call interface of a first messaging application in accordance with one or more embodiments.

As another entry point for generating a video room, the video room system 102 can provide a new call interface including a video room element as part of the first messaging application 110. In particular, the video room system 102 can provide (or display) a new call interface based on user interaction selecting a new call element (e.g., the phone-shaped icon with the "+" sign in the upper-right of the calls interface 402 in FIG. 4). FIG. 5 illustrates the creator device 108 displaying a new call interface 502 including a video call list 506 of users associated with the creator (e.g., users who are also registered with the first messaging application 110) and a video room element 404 in accordance with one or more embodiments.

As shown in FIG. 5, the video room system 102 populates the video call list 506 by identifying invitees with accounts registered with the first messaging application 110 and/or by identifying invitee devices of users associated with the creator and that have the first messaging application 110 installed. In addition (or alternatively), the video room system 102 identifies co-users of the social networking system 104 and/or determines relationships or affinities between the creator and co-users based on various interactions with each other or with various web content. In some embodiments, the video room system 102 thus generates the video call list 506 to include users that have at least a threshold strength of relationship (or a threshold affinity) with the creator and that are registered with the first messaging application 110.

Figure 6A:
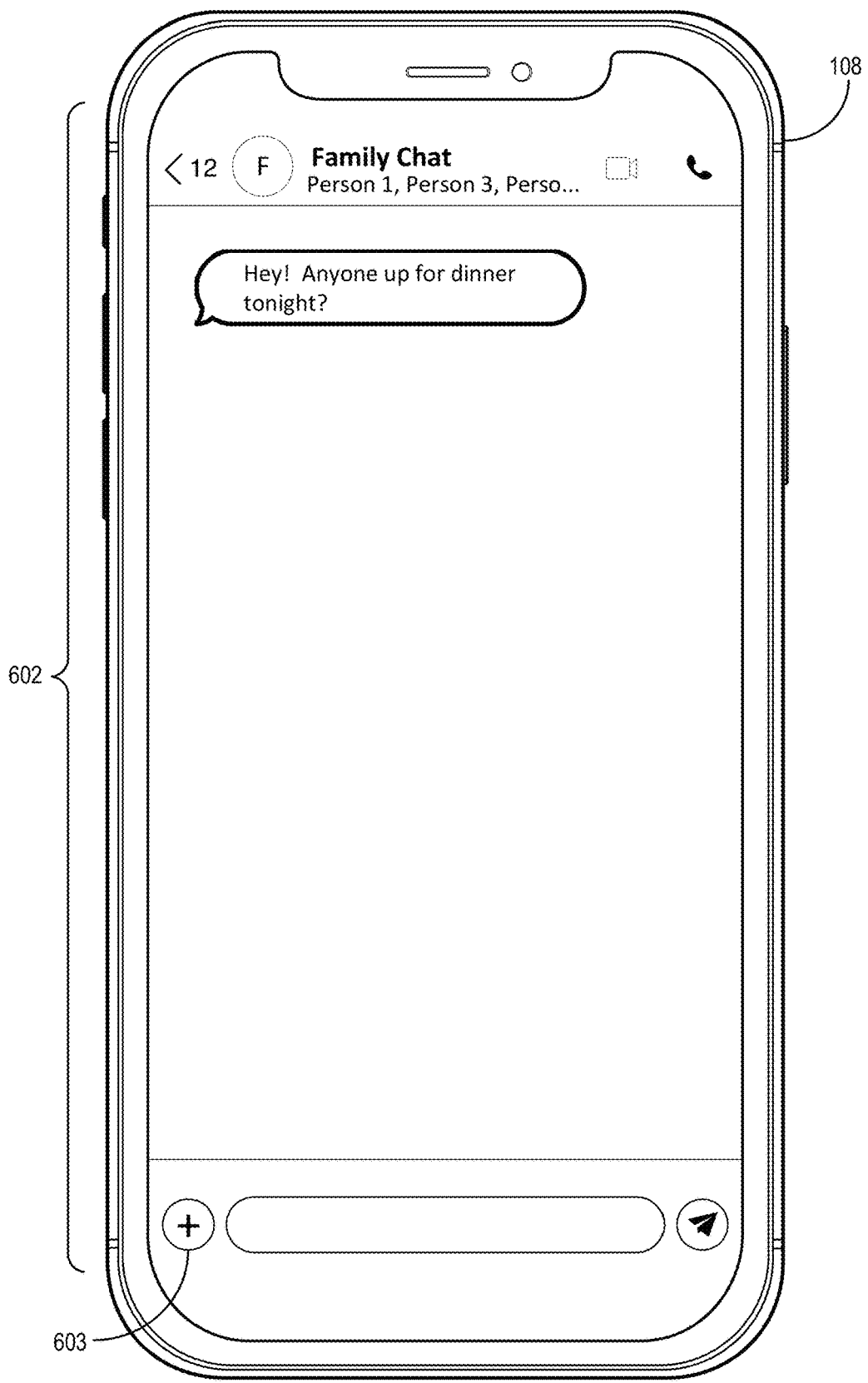
FIGS. 6A-6B illustrate an example chat interface for accessing a video room element from a first messaging application in accordance with one or more embodiments.

As mentioned, the video room system 102 can provide an entry point within a chat interface. In particular, the video room system 102 can provide a chat interface to display a chat thread between the creator and one or more other users of the first messaging application. FIG. 6A illustrates a chat interface 602 for "Family Chat" including various users in the chat thread such as "Person 1," "Person 3," and others in accordance with one or more embodiments. As shown, in FIG. 6A, the video room system 102 provides an attachment option 603 for display within the chat interface 602, where the attachment option 603 is selectable to access a message attachment menu.

Figure 6B:
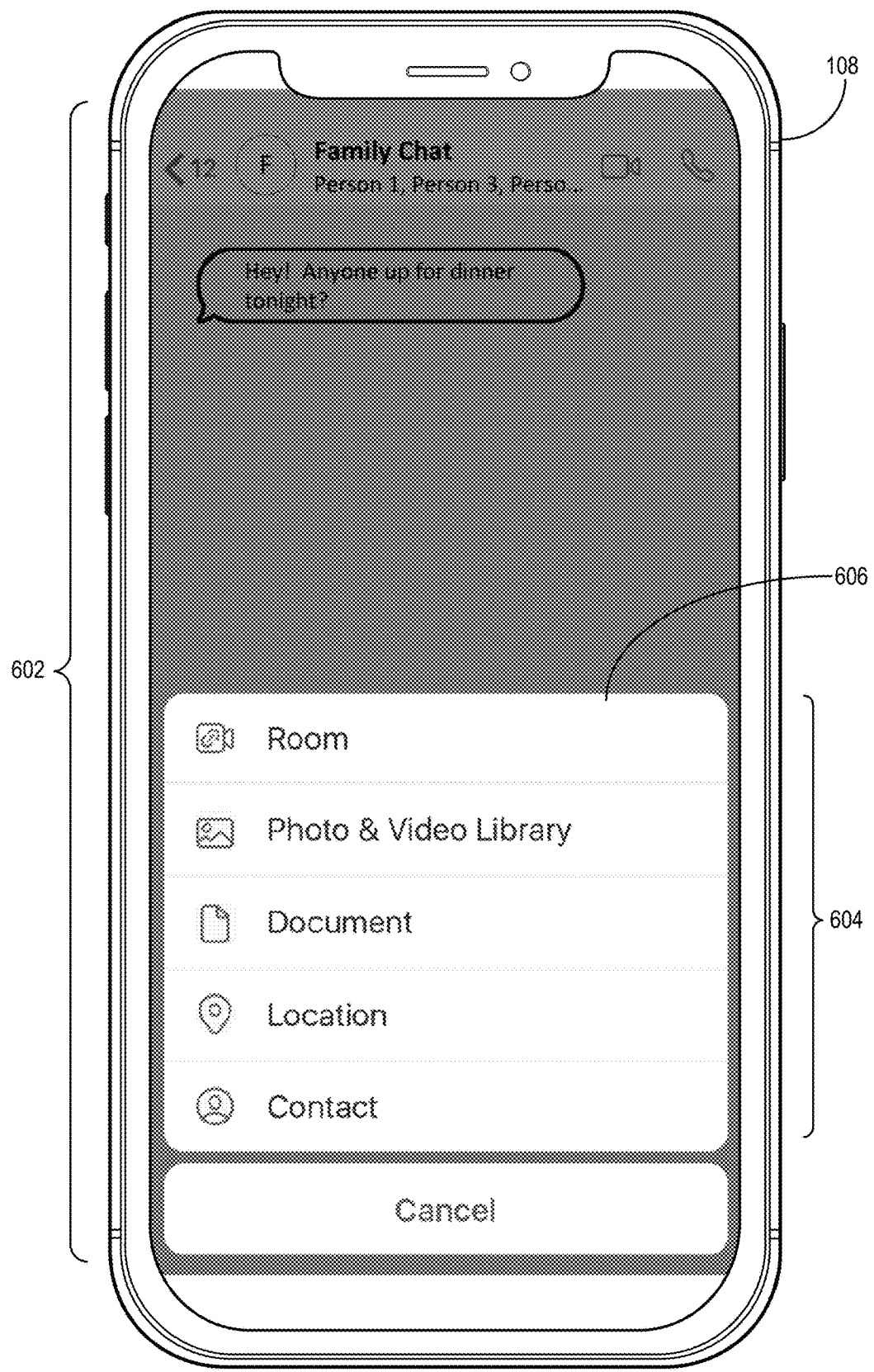

Indeed, based on receiving an indication of a user selection of the attachment option 603, the video room system 102 can provide a message attachment menu for display within the chat interface 602, where the message attachment menu can include a video room element for generating a video room. FIG. 6B illustrates the creator device 108 displaying the chat interface 602 that includes a message attachment menu 604 in accordance with one or more embodiments.

As illustrated in FIG. 6B, the message attachment menu 604 includes options for a creator to share various content within a chat, including photos, documents, locations, or contact information for various contacts. In addition, the video room system 102 includes the video room element 606 within the message attachment menu 604.

Upon receiving an indication of user interaction selecting the video room element 606, the video room system 102 accesses functions of the second messaging application 112 to generate a video room. In some embodiments, the video room system 102 further automatically provides a video room link (to access the generated video room) within the chat thread of the chat interface 602 (i.e., based on the video room originating from creator selection of the video room element 606 within the message attachment menu 604).

Figure 7A:
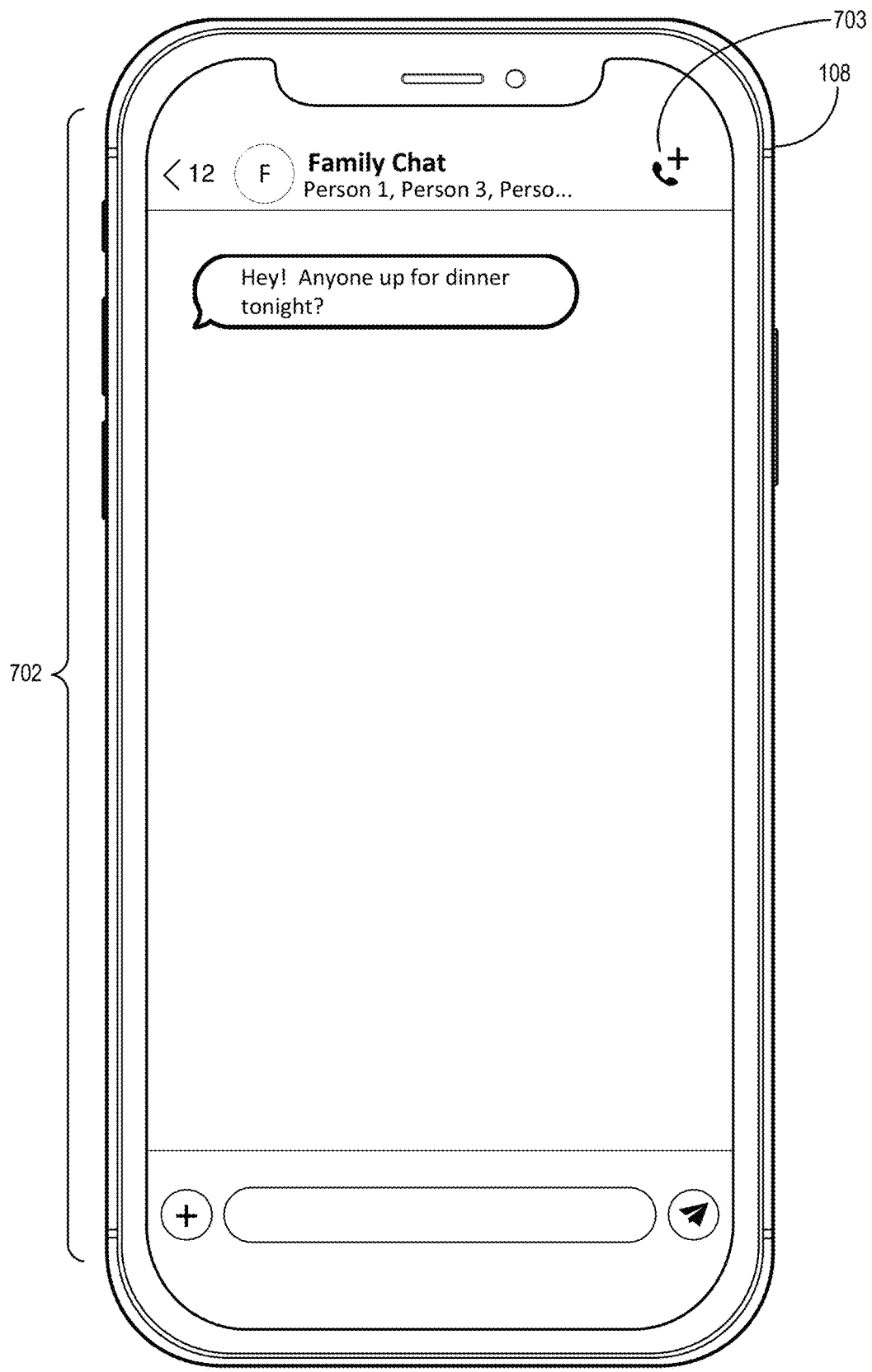
FIGS. 7A-7B illustrate another example chat interface for accessing a video room element from a first messaging application in accordance with one or more embodiments.

In addition to the above-described entry points, the video room system 102 can also provide a video room element within a new call menu of a chat interface. For example, FIG. 7A illustrates the creator device 108 displaying a chat interface 702 (for "Family Chat") that includes a new call element 703 in accordance with one or more embodiments. Upon receiving an indication of user interaction with the new call element 703, the video room system 102 provides a new call menu for display within the chat interface 702.

Figure 7B:
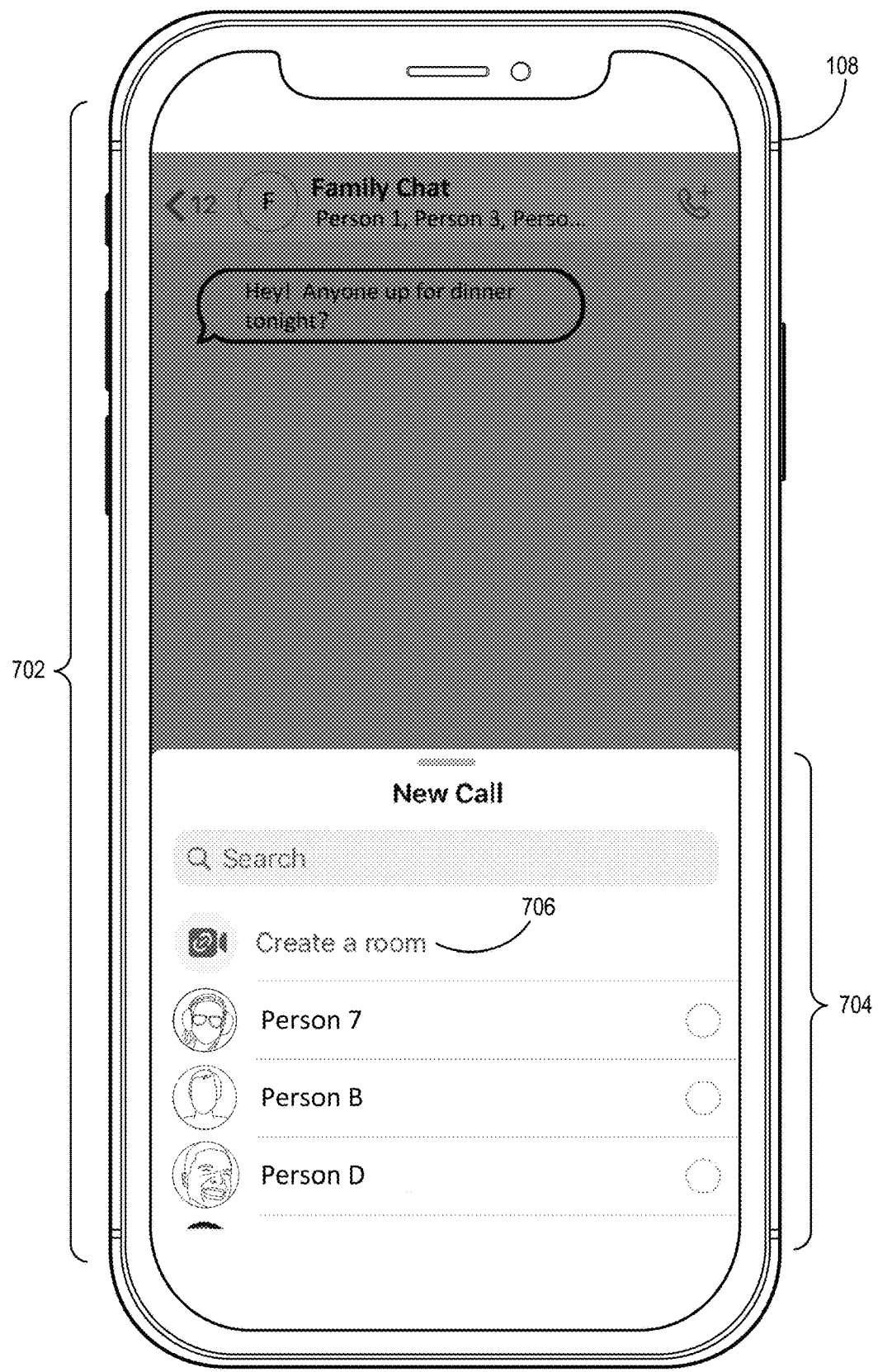

Indeed, FIG. 7B illustrates the creator device 108 displaying the chat interface 702 that includes the new call menu 704 in accordance with one or more embodiments. As illustrated in FIG. 7B, the new call menu 704 includes a video room element 706. Like the above discussions, the video room system 102 generates a video room based on user interaction with the video room element 706. In particular, the video room system 102 access, utilizes, and/or redirects the creator to the second messaging application 112 to generate a video room. Similar to the discussion of FIG. 6B, the video room system 102 can automatically provide a video room link for the video room within the chat thread of the chat interface 702 upon generating the video room by determining the selected video room element 706 is associated with the chat interface 702.

Figure 8:
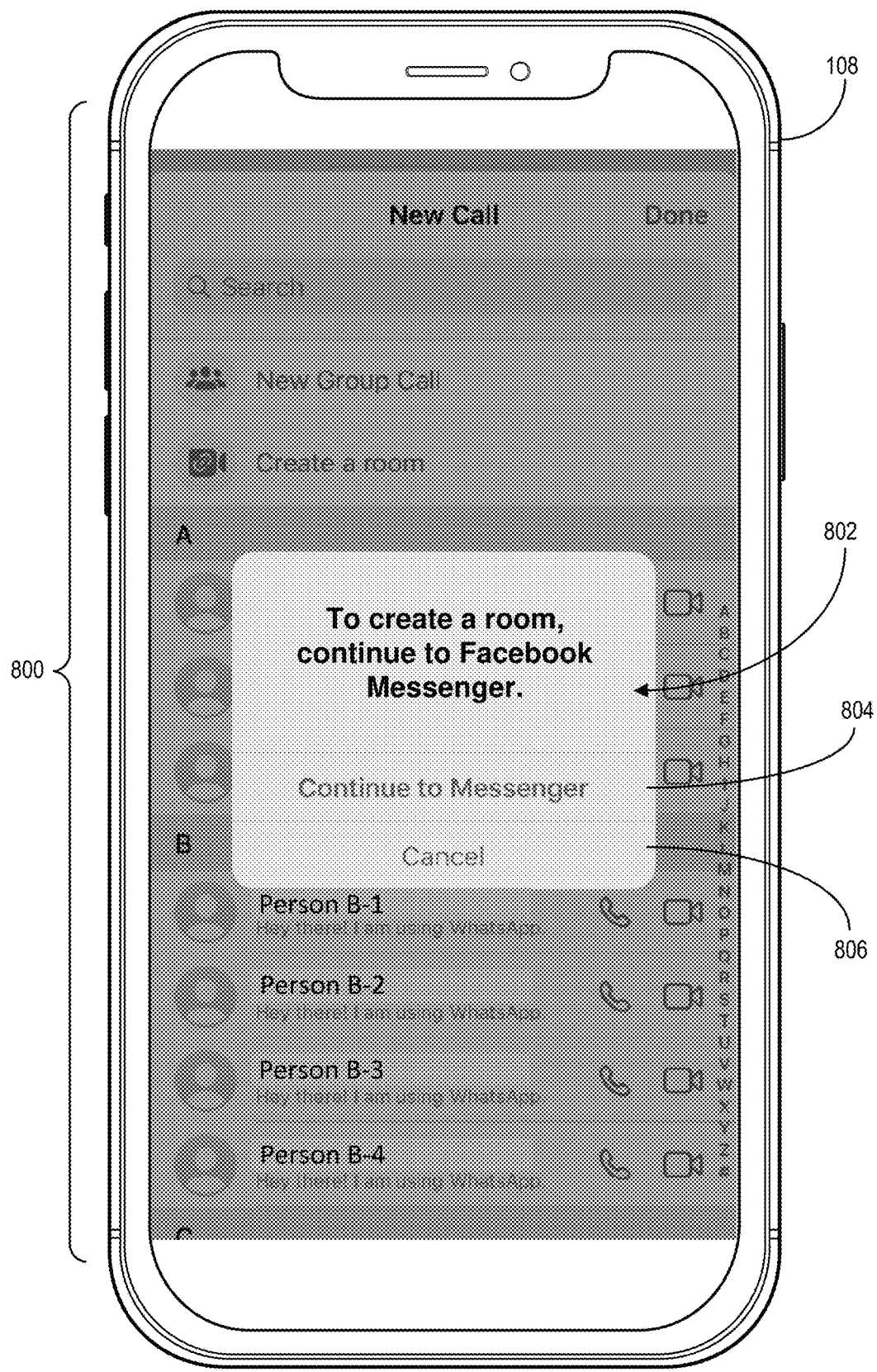
FIG. 8 illustrates an example redirection notification for accessing a second messaging application from a first messaging application in accordance with one or more embodiments.

As mentioned, based on user interaction with a video room element, the video room system 102 can generate a video room by accessing, utilizing, and/or redirecting to the second messaging application 112. FIG. 8 illustrates the creator device 108 displaying a redirection notification 802 within a new call interface 800 in accordance with one or more embodiments. The video room system 102 can similarly redirect from any of the above interfaces illustrated in FIGS. 4-7B that include a video room element.

As illustrated in FIG. 8, the redirection notification 802 includes a continue option 804 and a cancel 806. The redirection notification 802 further includes an indication that "To create a room, continue to Facebook Messenger." In response to user interaction with the continue option 804, the video room system 102 accesses the second messaging application 112 and displays a video room settings interface.

Figure 9A:
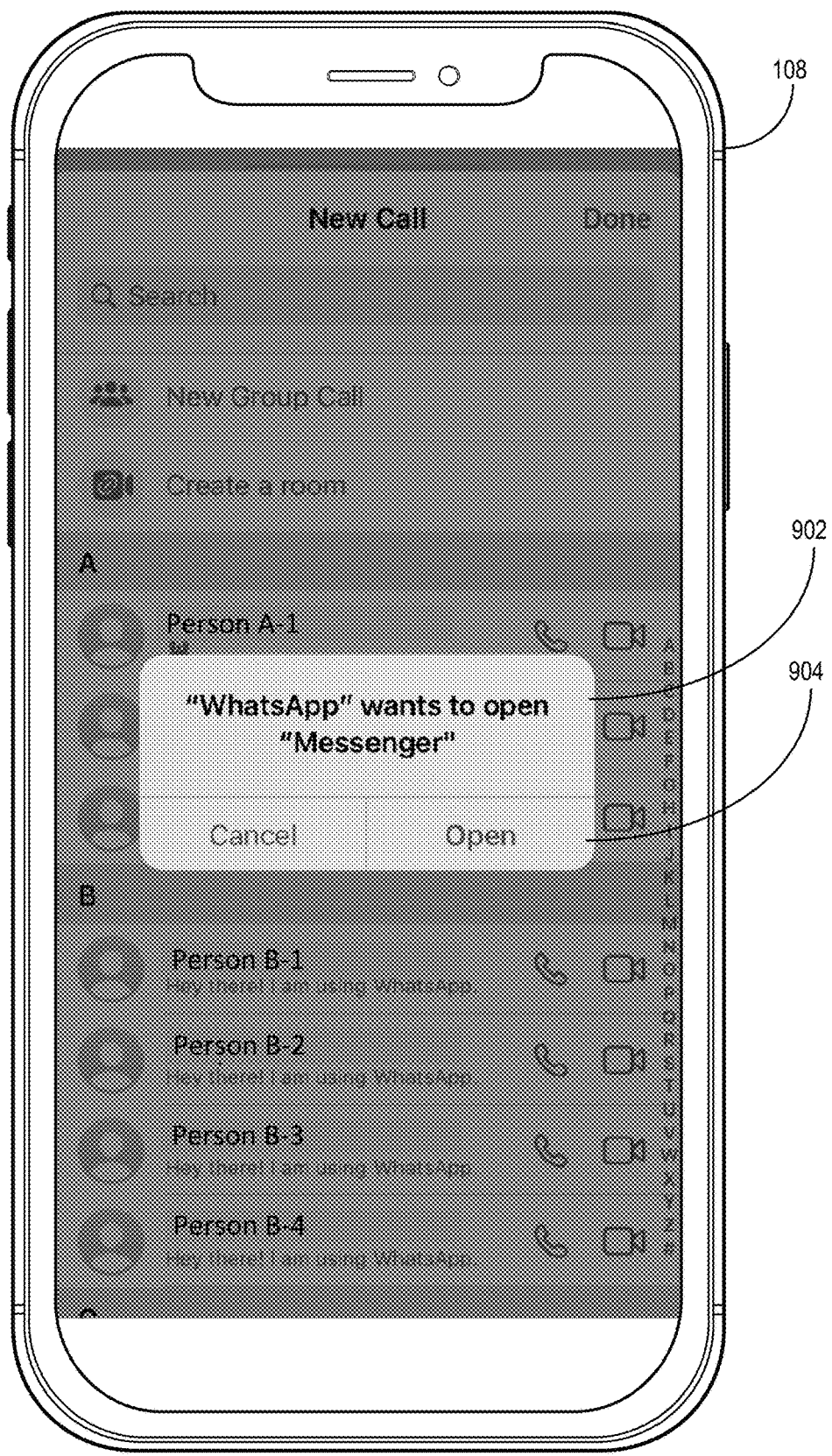
FIG. 9A illustrates another example redirection notification for accessing a second messaging application from a first messaging application in accordance with one or more embodiments.

Conversely, the video room system 102 cancels the redirection and the creation of a video room in response to user interaction with the cancel option 806. Relatedly, FIG. 9A illustrates an alternative (or additional) redirection notification 902 including an open option 904 in accordance with one or more embodiments. Based on user selection of the open option 904, the video room system 102 accesses and/or redirects to the second messaging application 112 to generate a video room.

Figure 9B:
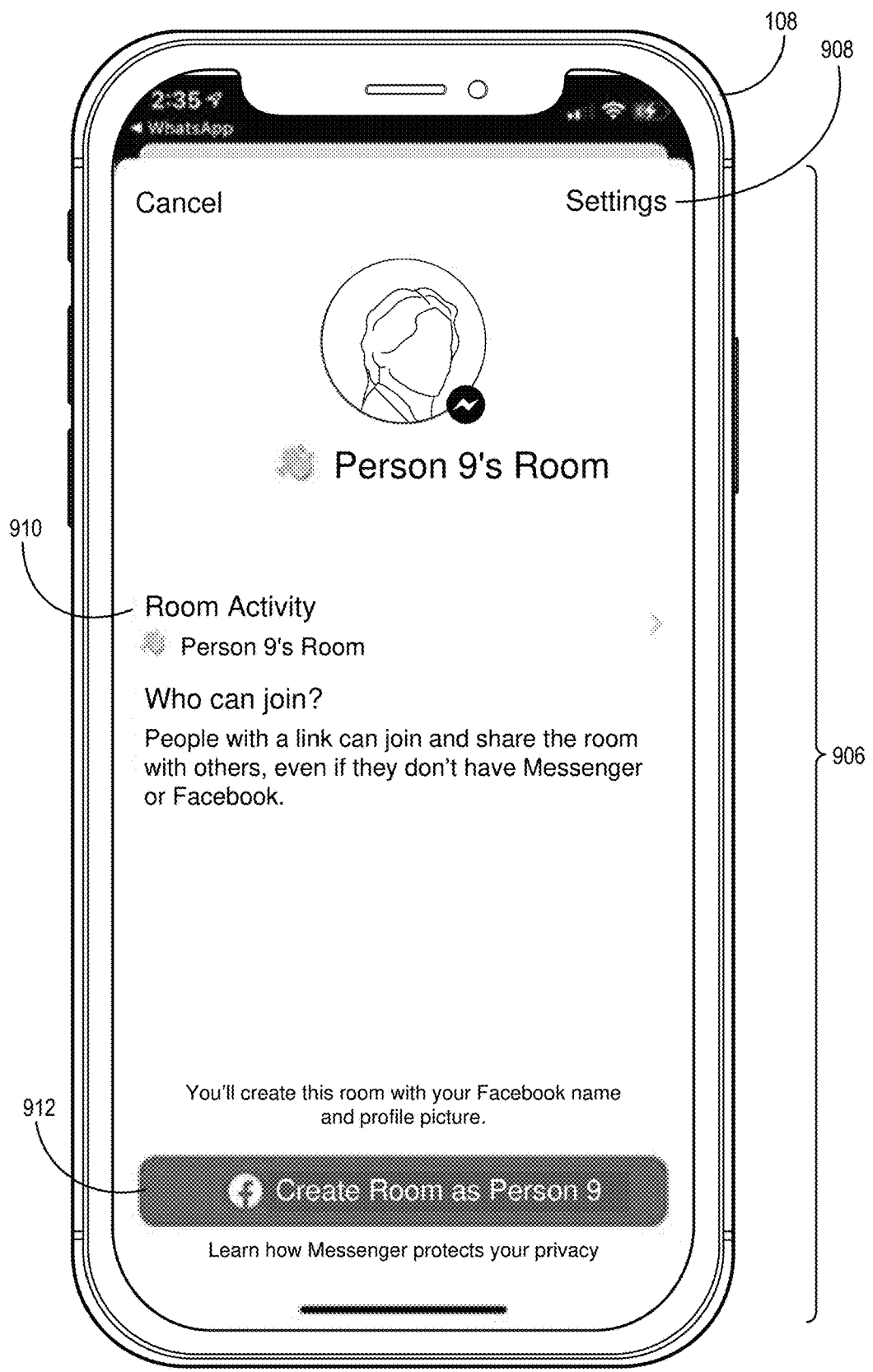
FIG. 9B illustrates an example video room creation interface associated with a second messaging application in accordance with one or more embodiments.

Based on receiving an indication of user interaction to continue to the second messaging application 112 to generate a video room, the video room system 102 can transition to the second messaging application 112 to provide a video room creation interface. In particular, the video room system 102 can cause the creator device 108 to transition from displaying an interface of the first messaging application 110 to displaying an interface of the second messaging application 112. FIG. 9B illustrates a video room creation interface 906 associated with the second messaging application 112 in accordance with one or more embodiments.

As illustrated in FIG. 9B, the video room system 102 generates and provides the video room creation interface 906 for display on the creator device 108. In particular, the video room system 102 generates the video room creation interface 906 to include a number of selectable options or elements. For example, the video room creation interface 906 includes a settings option 908, a room activity option 910, and a create room option 912.

Figure 10:
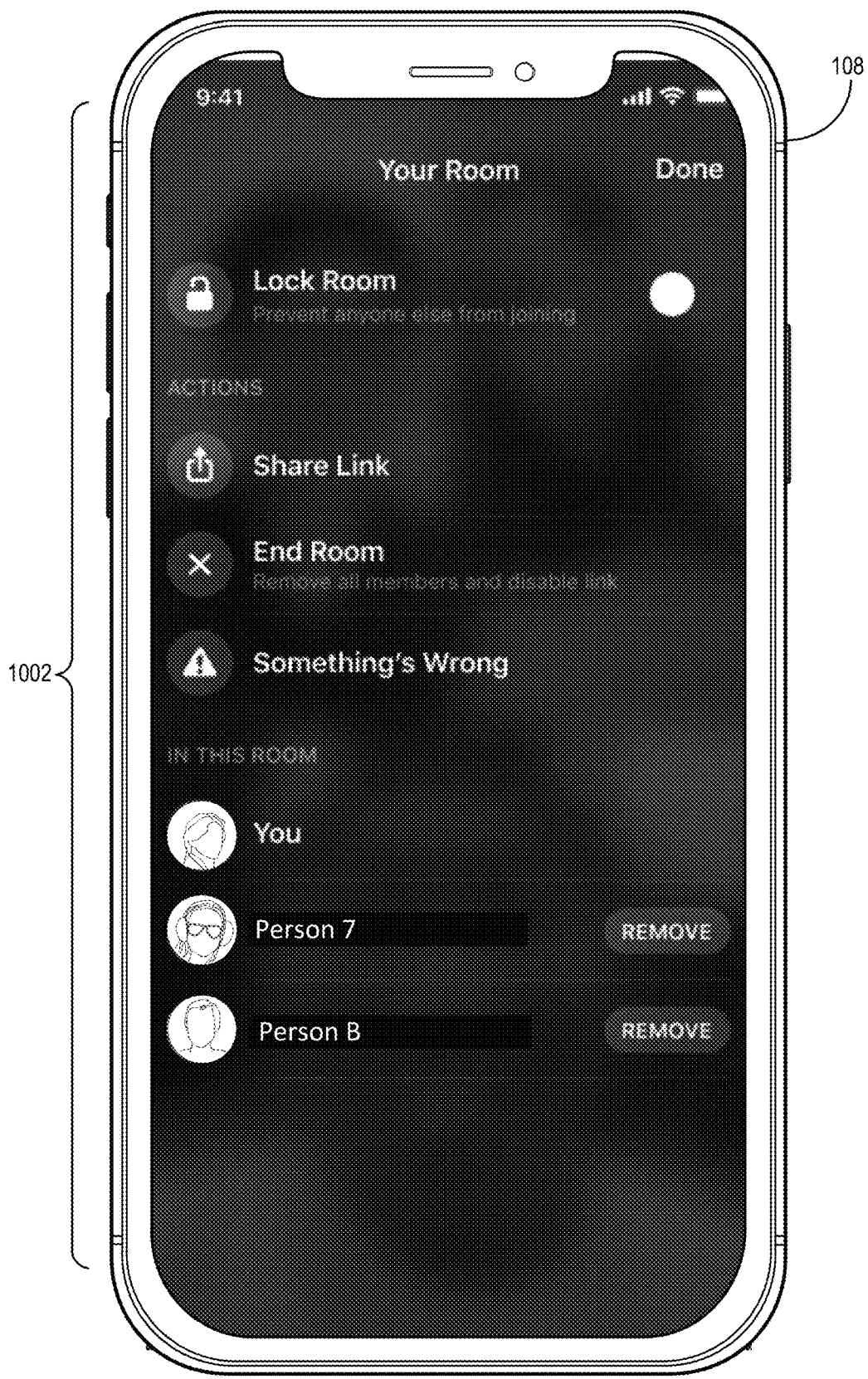
FIG. 10 illustrates an example video room settings interface of a second messaging application in accordance with one or more embodiments.

In response to user interaction selecting the settings option 908, the video room system 102 provides a video room settings interface, as discussed in relation to FIG. 10. In response to user interaction with the room activity option 910, the video room system 102 provides a display of user activity associated with the video room. For example, the video room system 102 provides a display element indicating user accounts that have requested to join, that have already joined, and/or that have left the video room. In some cases, the video room system 102 generates and provides a chronological history of all activity within the video room. In these or other cases, the video room system 102 generates the history to further include indications of any shared media within the video room (including the name of the media and the user account which shared the media and when the sharing occurred).

In response to user interaction selecting the create room option 912, the video room system 102 generates the video room. In particular, the video room system 102 generates the video room according to the settings (described in relation to FIG. 10) set by the creator device 108. For instance, as described above, the video room system 102 makes a virtual space accessible via a link for other devices to join.

As mentioned, the video room system 102 can provide a video room settings interface for generating a video room. FIG. 10 illustrates the creator device 108 displaying a video room settings interface 1002 in accordance with one or more embodiments. As shown in FIG. 10, the video room settings interface 1002 includes options for changing certain settings for a video room. For instance, the video room settings interface 1002 includes a selectable option for locking the video room to prevent additional users/devices from joining. In addition, the video room settings interface 1002 includes a selectable option for sharing a video room link to generate a video room link sharable via the first messaging application 110, the second messaging application 112, a text messaging application, or an email application. Further, the video room settings interface 1002 includes a selectable option for ending the video room which causes the creator device 108 to leave the video room and causes the video room system 102 to force out all invitee devices participating in the video room and disable the video room link. Additionally, the video room settings interface 1002 includes a selectable option for removing particular participants from the video room.

In some embodiments, within the video room settings interface 1002, the video room system 102 provides the creator device 108 with additional audience controls. In particular, the video room system 102 enables the creator device 108 to control a number of users within a video room, whether or not particular users can join the video room, and/or which types of devices can join the video room. For instance, the video room system 102 provides a selectable option to set a threshold number of participants for a video room. As another example, the video room system 102 provides a selectable option for identifying user accounts forbidden, blocked, or prevented from joining the video room. Further, the video room system 102 provides a selectable option to indicate which types of join attempts are allowed access to the video room (e.g., only devices accessing from the second messaging application 112 and/or devices associate with users with an account with the social networking system 104). For example, a creator device 108 can indicate that "People with the link," "Only people on Facebook," or "Only people on Messenger" can join.

The video room system 102 further provides audience control to the creator device 108 by enabling the creator device 108 to lock a video room. In some embodiments, the video room system 102 locks a video room only by express input to lock the video room. In other embodiments, the video room system 102 locks a video room when a creator device 108 leaves the video room, but the video room system 102 keeps the video room active.

Figure 11:
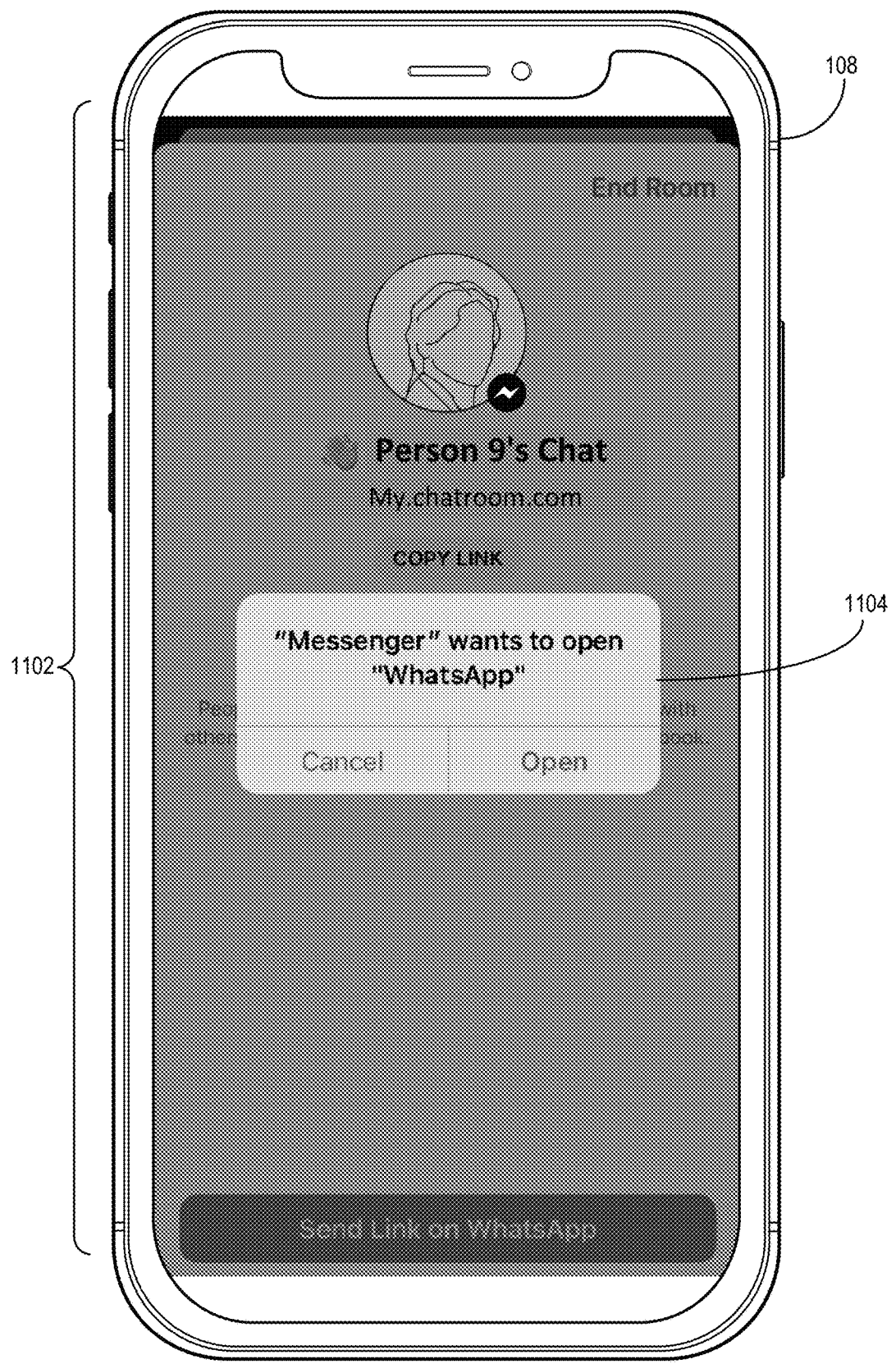
FIG. 11 illustrates an example redirect notification for accessing a first messaging application from a second messaging application after generating a video room in accordance with one or more embodiments.

After generating a video room via the second messaging application 112, the video room system 102 can transition back to the first messaging application 110. In particular, the video room system 102 can provide a redirect notification requesting permission to access the first messaging application 110 and to return the creator to a previous location (e.g., a particular chat or location with a chat at a time when the creator selected a video room element). In some embodiments, the video room system 102 redirects to the first messaging application 110 upon user interaction selecting a video room link sharing element. FIG. 11 illustrates the creator device 108 displaying a video room sharing interface 1102 associated with the second messaging application 112 and including a redirect notification 1104 in accordance with one or more embodiments.

As illustrated in FIG. 11, the video room sharing interface 1102 includes video room link sharing element (the button with the text "Send Link on WhatsApp"). Based on receiving an indication of a user interaction with the video room link sharing element, the video room system 102 provides the redirect notification 1104 ("'Messenger' wants to open 'WhatsApp'") for display within the video room sharing interface 1102 and requesting permission to return to the first messaging application 110. In some cases, the video room system 102 receives an indication to provide the redirect notification 1104 from the operating system of the creator device 108. Indeed, some operating systems require user consent before transitioning from one application to another (e.g., via a deep link).

For example, when generating a video room link, the video room system 102 generates a data packet to include as part of the video room link. In some cases, the data packet includes information such as a chat thread identifier and/or a chat location identifier. Based on the chat thread identifier and/or the chat location identifier, the video room system 102 redirects the creator device 108 to a particular chat location for inserting the video room link. Thus, the video room system 102 causes the creator device 108 to redirect from the second messaging application 112 to the first messaging application 110 and provides (or causes the creator device 108 to display) the same chat thread (and/or the same location within the chat thread) that the creator device 108 was displaying when the creator selected the video room element. In some embodiments, the second messaging application 112 has an open protocol to facilitate redirecting to any first party application (e.g., an application associated with the social networking system 104) that first initiated the transaction within the second messaging application 112 (or the transition to the second messaging application 112).

Figure 12:
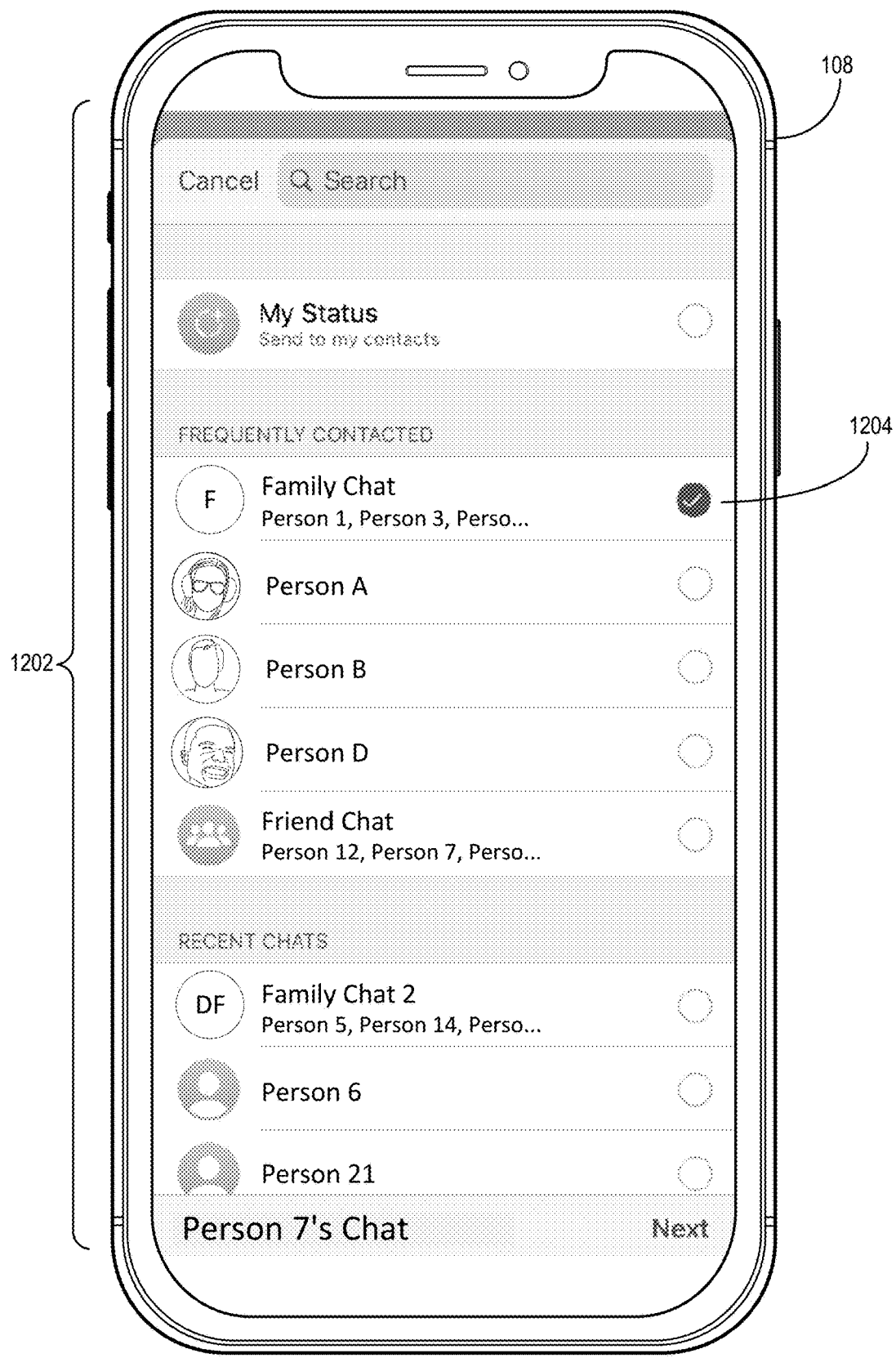
FIG. 12 illustrates an example chat selection interface for sharing a video room link within a first messaging application in accordance with one or more embodiments.

Relatedly, FIG. 12 illustrates the creator device 108 displaying a chat selection interface 1202 of the first messaging application 110 based on redirecting from the second messaging application 112 in accordance with one or more embodiments. As illustrated in FIG. 12, the video room system 102 provides the chat selection interface 1202 whereby the creator can select a chat in which to share a generated link for a video room. The chat selection interface 1202 depicts a selection indicator 1204 indicating that the creator has selected "Family Chat" as the chat in which to share the generated video room link.

Figure 13:
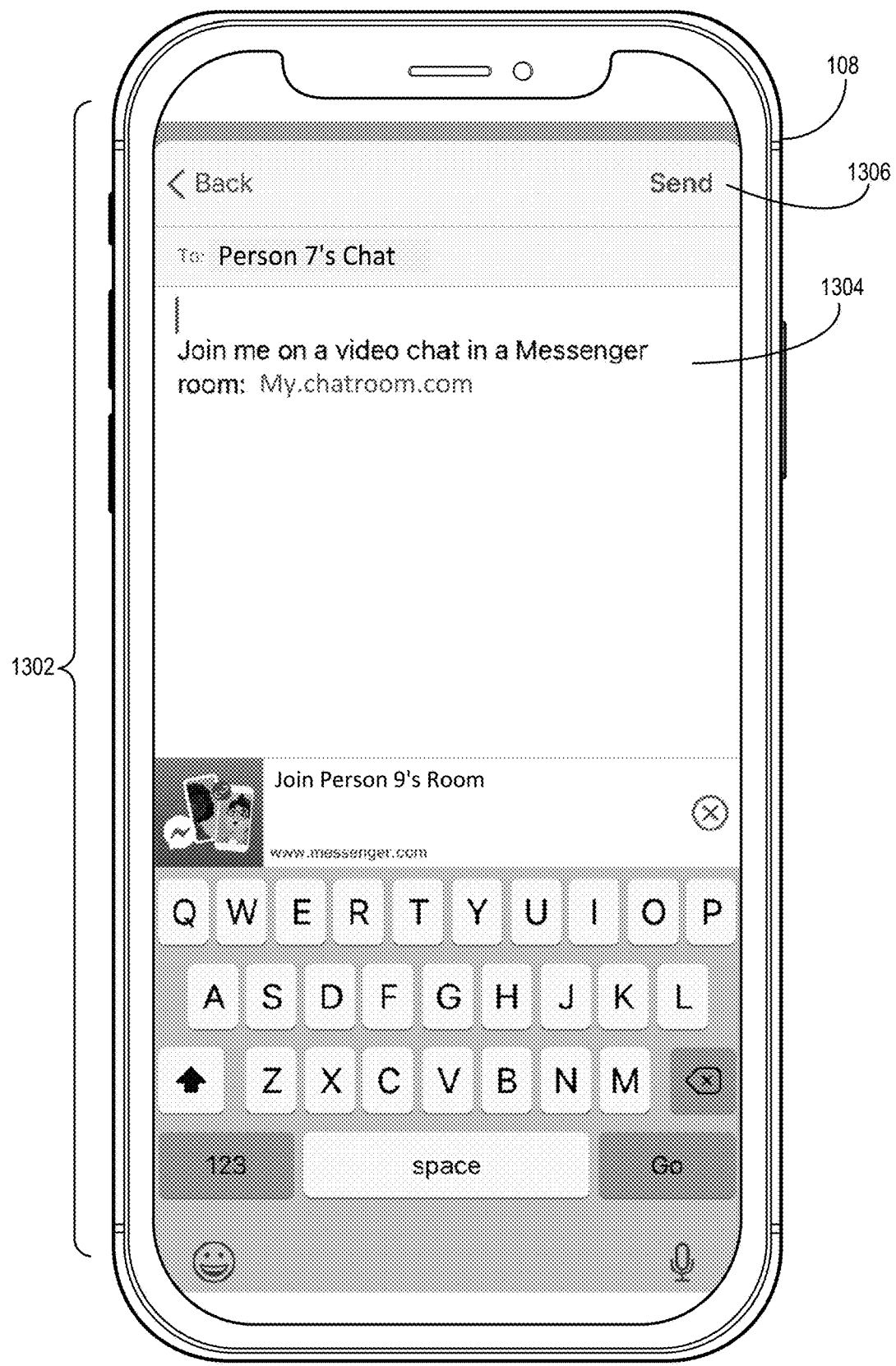
FIG. 13 illustrates an example message composition interface for composing a message including a video room link within a first messaging application in accordance with one or more embodiments.

Based on detecting a selection of a chat in which to share a video room link, the video room system 102 can provide (or cause the creator device 108 to display) a message composition interface for sending the video room link. In some embodiments, the video room system 102 can provide the message composition interface including the video room link based on creator selection of a video room link sharing element (e.g., without first providing the chat selection interface 1202 of FIG. 12). FIG. 13 illustrates the creator device 108 displaying a message composition interface 1302 (e.g., "Family Chat") including a video room link 1304 in accordance with one or more embodiments. Indeed, based on a selection of the chat from the chat interface 1202 (or based on a selection of the video room link sharing element to share the video link generated for the particular chat), the video room system 102 populates a chat message with the video room link 1304 for adding to "Family Chat," as shown within the message composition interface 1302.

In addition, the message composition interface 1302 includes a send option 1306 selectable to send the chat message including the video room link 1304 to the chat. Thus, other users (e.g., the invitee devices 114a-114n) within the "Family Chat" can join the video room by selecting the video room link 1304. Indeed, the video room system 102 add an invitee device to the video room based on detecting or identifying a selection of the video room link 1304.

Figure 14:
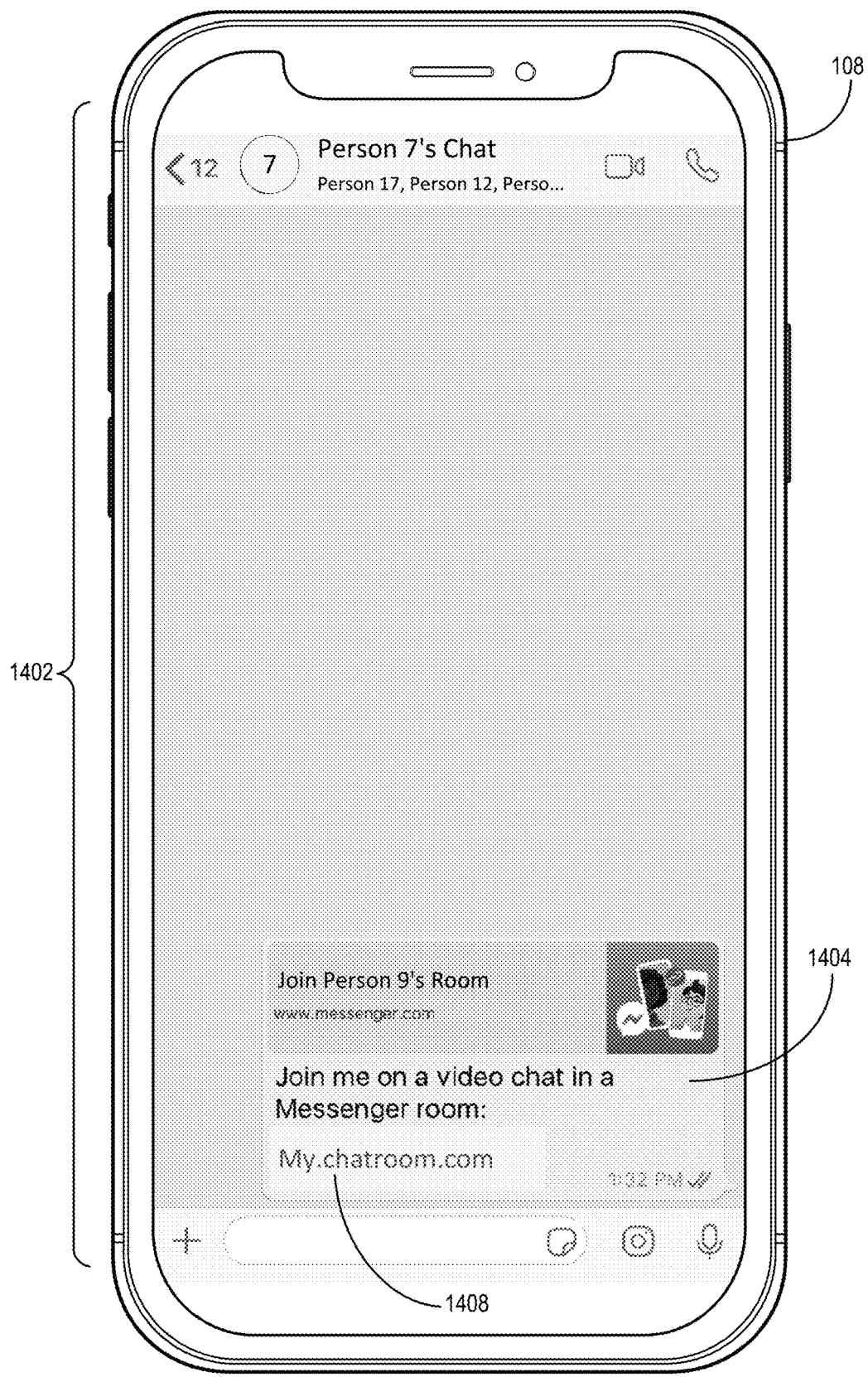
FIG. 14 illustrates an example chat interface for providing a video room link within a chat thread of the first messaging application in accordance with one or more embodiments.

As mentioned, the video room system 102 can provide a chat interface based on user selection of the send option 1306. In some embodiments, the video room system 102 can provide a chat interface including a video room link based on creator selection of a video room link sharing element (e.g., without first providing the chat selection interface 1202 of FIG. 12 and/or the message composition interface 1302 of FIG. 13). Along these lines, FIG. 14 illustrates the creator device 108 displaying a chat interface 1402 including a video room link 1404 based on user interaction with the send option 1306 (or based on automatically sending the video room link 1404) in accordance with one or more embodiments.

In addition to the chat interface 1402 displayed on the creator device 108, the video room system 102 provides a similar interface for display on invitee devices associated with users in the chat (e.g., the invitee devices 114a-114n). As illustrated, the video room system 102 provides the video room link 1404 within the chat interface 1402 (and corresponding chat interfaces on other devices) so that other members of the chat can select the video room link 1404 to join the video room.

Figure 15:
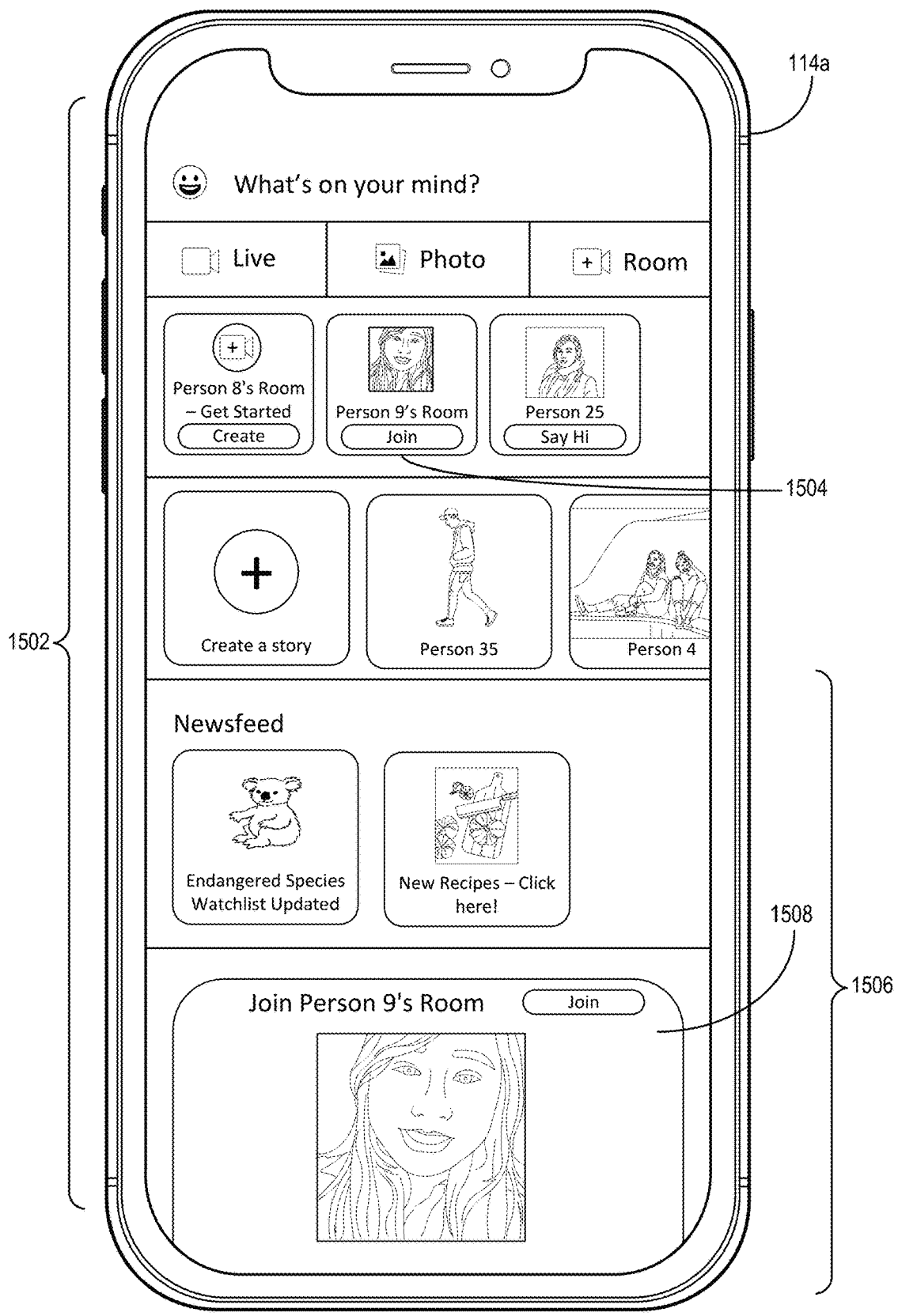
FIG. 15 illustrates an example social networking interface for surfacing a video room link based on connections between users in accordance with one or more embodiments.

As mentioned above, the video room system 102 can surface video room links to invitee devices. In particular the video room system 102 can provide video room links for display within social networking feeds of invitees (or users deemed to be invitees based on connections with the creator). FIG. 15 illustrates the invitee device 114a displaying a social networking interface 1502 including a social networking feed 1506 (e.g., "Newsfeed") in accordance with one or more embodiments. The social networking feed 1506 is scrollable to view additional content such as posts and status updates below the viewable portion illustrated in FIG. 15.

As shown in FIG. 15, the social networking interface 1502 includes two video room links, the video room link 1504 and the video room link 1508. The video room system 102 provides the video room link 1504 for display within a discovery pane of the social networking interface 1502 based on determining that the invitee associated with the invitee device 114a has at least a threshold affinity with the creator user. In some cases, as described, the video room system 102 utilizes a machine learning model to determine a likelihood that the invitee device 114a would join the video room based on factors such as affinity and previous participation in video rooms. In any event, the video room system 102 surfaces the video room link 1504 within the social networking interface 1502 based on the affinity and/or the machine learning model prediction. As an additional or alternative location within the social networking interface 1502, the video room system 102 provides the video room link 1508 for display within the social networking feed 1506.

In some cases, one location may be more likely than the other to result in joining the video room. The video room system 102 can thus determine whether to provide the video room link 1504 or the video room link 1508 (or both) based on an affinity between user accounts and/or a probability of joining the video room. For example, the video room system 102 determines that providing the video room link 1504 at the location in the banner fixed to the top portion of the social networking interface 1502 is more likely to result in the invitee device 114a joining the video room. Thus, the video room system 102 provides the video room link 1504 in response to determining a higher affinity between the invitee user account and the creator user accounts and/or determining a higher join probability. Conversely, the video room system 102 may provide the video room link 1508 in response to determining a lower affinity score and/or a lower probability.

Figure 16:
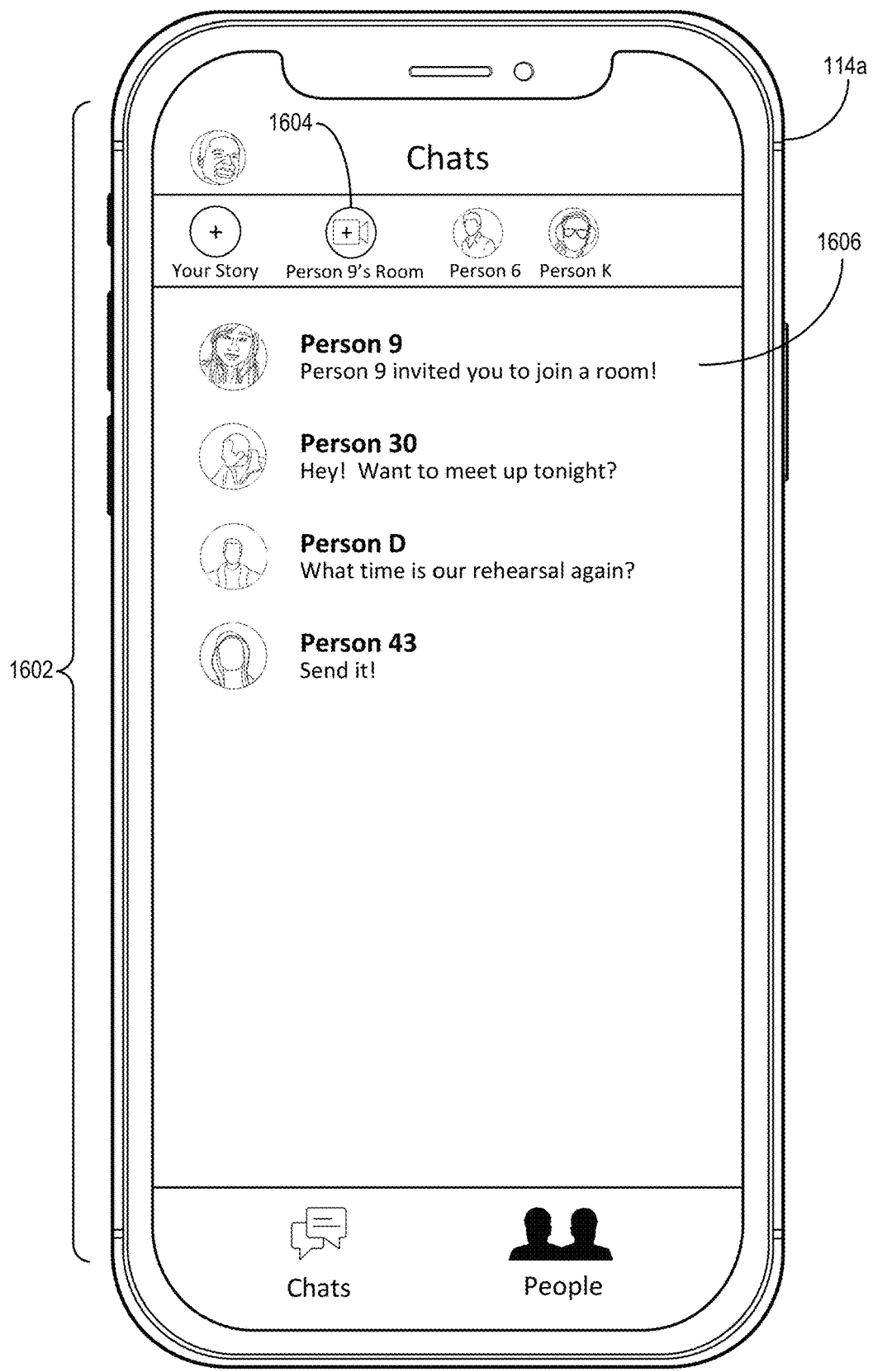
FIG. 16 illustrates an example chats interface of a second messaging application for surfacing a video room link in accordance with one or more embodiments.

In addition (or alternatively) to providing video room links within a social networking feed, the video room system 102 can provide video room links for display within the second messaging application 112. In particular, the video room system 102 can provide a video room link for display within a chats interface of the second messaging application 112. FIG. 16 illustrates the invitee device 114a displaying a chats interface 1602 of the second messaging application 112 in accordance with one or more embodiments.

As illustrated in FIG. 16, the chats interface 1602 includes a video room link 1604 and a video room link 1606 for the video room associated with the creator device 108. As shown, the video room system 102 provides the video room link 1604 within a discovery pane of the second messaging application 112. The video room system 102 also (or alternatively) provides the video room link 1606 for display within a chats menu of selectable chat elements for viewing chat threads within the second messaging application 112.

The video room system 102 surfaces the video room link 1604 based on determining an affinity between an invitee user account and the creator user account within the social networking system 104 and/or based on determining a join probability via a machine learning model. Additionally or alternatively, the video room system 102 provides the video room link 1606 based on the same criteria.

In some embodiments, the video room system 102 provides the video room link 1604 and/or the video room link 1606 based on additional or alternative criteria. As an example, the video room system 102 determines that the invitee associated with the invitee device 114a is registered with the second messaging application 112. As mentioned above, the second messaging application 112 is associated with, and has access to, social networking information of the social networking system 104 such as social graphs and behavior data.

Figure 17:
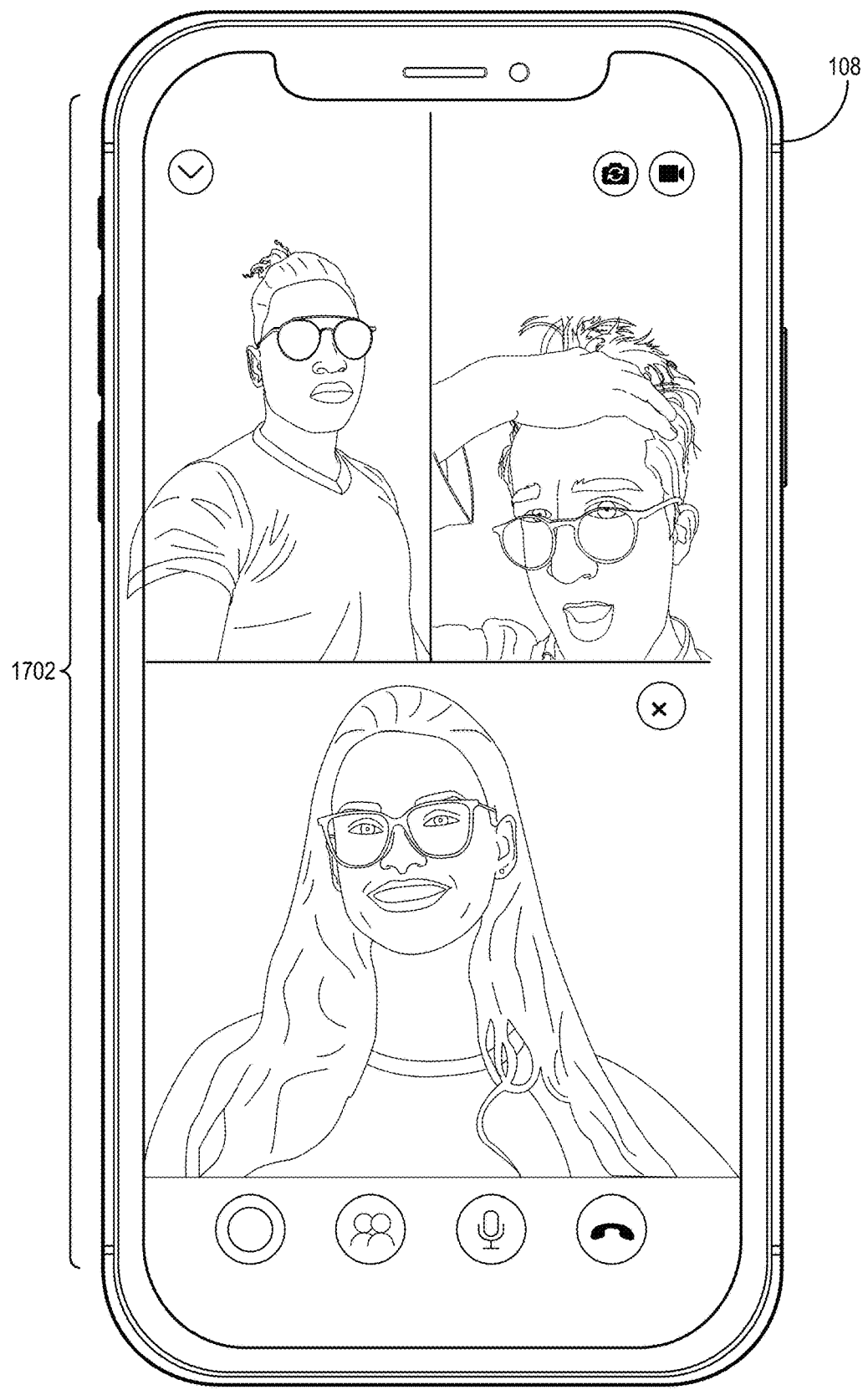
FIG. 17 illustrates an example video room interface for facilitating video conferencing between devices in accordance with one or more embodiments.

As mentioned, based on detecting or receiving selections of a video room link from one or more of the invitee devices 114a-114n within a chat, the video room system 102 can facilitate video chatting between the creator device 108 and the one or more invitee devices 114a-114n. Indeed, the video room system 102 can provide and display video streams captured by cameras of various client devices such as the creator device 108 and the invitee device 114a. FIG. 17 illustrates the creator device 108 displaying a video room interface 1702 in accordance with one or more embodiments.

As illustrated in FIG. 17, the video room interface 1702 includes a plurality of video streams from respective devices of those within the video room. In some embodiments, the video room system 102 provides windows of different sizes for different streams within the video room. For example, the video room system 102 identifies a dominant speaker and provides the stream from the device associated with the dominant speaker as the largest window within the video room interface 1702.

To determine the dominant speaker, in some cases, the video room system 102 analyzes volume amplitude associated with invitee devices within the video room. For example, the video room system 102 determines volume amplitude associated with each invitee device and compares the amplitudes to see which invitee device is dominant. In some cases, the video room system 102 determines a dominant speaker based on a threshold volume amplitude. For example, the video room system 102 identifies an invitee device with a volume amplitude that satisfies the volume threshold as the dominant speaker. Additionally, the video room system 102 adjusts or modifies the volume threshold based on volume amplitudes of the invitee devices. For instance, if the video room system 102 determines high volume amplitudes for several invitee devices, the video room system 102 automatically increases the volume threshold. Conversely, if the video room system 102 determines low volume amplitudes for all (or a subset) of the invitee devices, the video room system 102 decreases the volume threshold.

Figure 18:
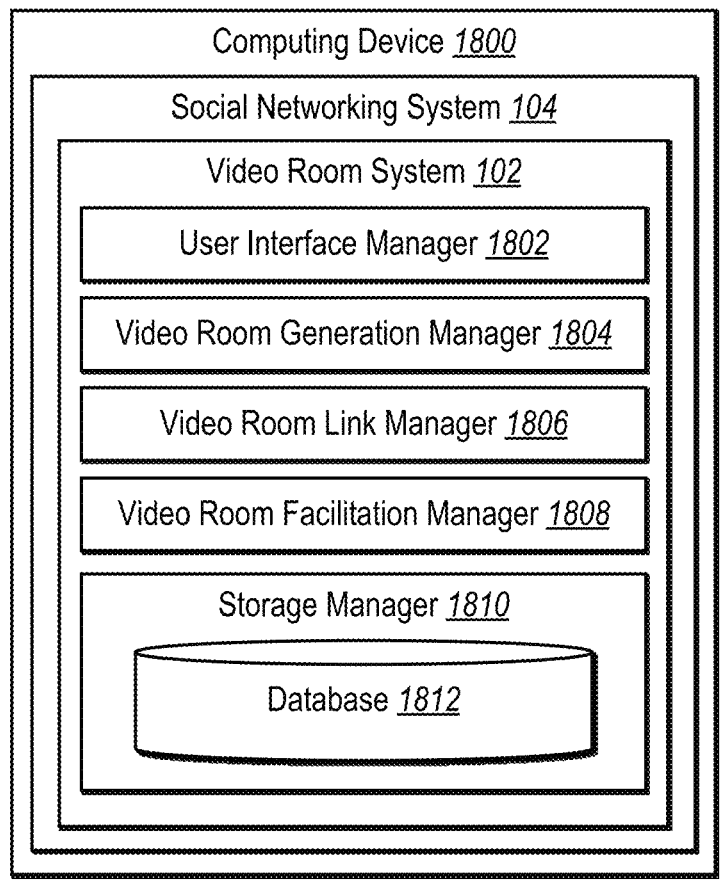
FIG. 18 illustrates an example schematic diagram of a computing device including various components of a video room system in accordance with one or more embodiments.

Looking now to FIG. 18, additional detail will be provided regarding components and capabilities of the video room system 102. Specifically, FIG. 18 illustrates an example schematic diagram of the video room system 102 on an example computing device 1800 (e.g., one or more of the creator device 108, the server(s) 106, and/or the invitee devices 114a-114n). As shown in FIG. 18, the video room system 102 may include a user interface manager 1802, a video room generation manager 1804, a video room link manager 1806, a video room facilitation manager 1808, and a storage manager 1810.

As mentioned, the video room system 102 includes a user interface manager 1802. In particular, the user interface manager 1802 manages, maintains, provides, displays, presents, renders, or rasterizes user interface elements within one or more user interfaces of the first messaging application 110, the second messaging application 112, and/or a social networking application associated with the social networking system 104. For example, the user interface manager 1802 provides video room elements and video room links for display in user interfaces in accordance with the above description.

As shown, the video room system 102 also includes a video room generation manager 1804. In particular, the video room generation manager 1804 manages, maintains, generates, or creates a video room. For example, the video room generation manager 1804 generates a video room based on user interaction with a video room element. In addition, the video room generation manager 1804 determines video room settings based on input from the creator device 108. The video room generation manager 1804 communicates with the storage manager 1810 to store video room data (e.g., a URL of the video room) within the database 1812.

In addition, the video room system 102 includes a video room link manager 1806. In particular, the video room link manager 1806 generates, maintains, manages, identifies, provides, displays, or distributes a video room link for a video room. In some embodiments, the video room link manager 1806 communicates with the user interface manager 1802 to provide a video room link within a particular user interface on the creator device 108 and/or one or more of the invitee devices 114a-114n. For example, the video room link manager 1806 determines receives input from the creator device 108 to share the video room link with a particular invitee device. In addition, the video room link manager 1806 determines connections between the creator and invitees to automatically surface a video room link, as described above.

Further, the video room system 102 includes a video room facilitation manager 1808. In particular, the video room facilitation manager 1808 facilitates video conferencing within a video room by receiving and providing video and audio streams from participating devices with permission to access the video room. In addition, the video room facilitation manager 1808 keeps a video room open for a threshold period of time (even without any participating devices) or until the creator closes the video room.

In one or more embodiments, each of the components of the video room system 102 are in communication with one another using any suitable communication technologies. Additionally, the components of the video room system 102 can be in communication with one or more other devices including one or more client devices described above. It will be recognized that although the components of the video room system 102 are shown to be separate in FIG. 18, any of the subcomponents may be combined into fewer components, such as into a single component, or divided into more components as may serve a particular implementation. Furthermore, although the components of FIG. 18 are described in connection with the video room system 102, at least some of the components for performing operations in conjunction with the video room system 102 described herein may be implemented on other devices within the environment.

The components of the video room system 102 can include software, hardware, or both. For example, the components of the video room system 102 can include one or more instructions stored on a computer-readable storage medium and executable by processors of one or more computing devices (e.g., the computing device 1800). When executed by the one or more processors, the computer-executable instructions of the video room system 102 can cause the computing device 900 to perform the methods described herein. Alternatively, the components of the video room system 102 can comprise hardware, such as a special purpose processing device to perform a certain function or group of functions. Additionally or alternatively, the components of the video room system 102 can include a combination of computer-executable instructions and hardware.

Furthermore, the components of the video room system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the video room system 102 may be implemented as part of a stand-alone application on a personal computing device or a mobile device. Alternatively or additionally, the components of the video room system 102 may be implemented in any application that allows creation and delivery of marketing content to users, including, but not limited to, various applications.

FIGS. 1-18, the corresponding text, and the examples provide a number of different systems, methods, and non-transitory computer readable media for generating and providing video room links using a cross-application process that includes accessing functions of a second messaging application via user interaction within a first messaging application. In addition to the foregoing, embodiments can also be described in terms of flowcharts comprising acts for accomplishing a particular result. For example, FIG. 19 illustrates a flowchart of an example sequence of acts in accordance with one or more embodiments.

Figure 19:
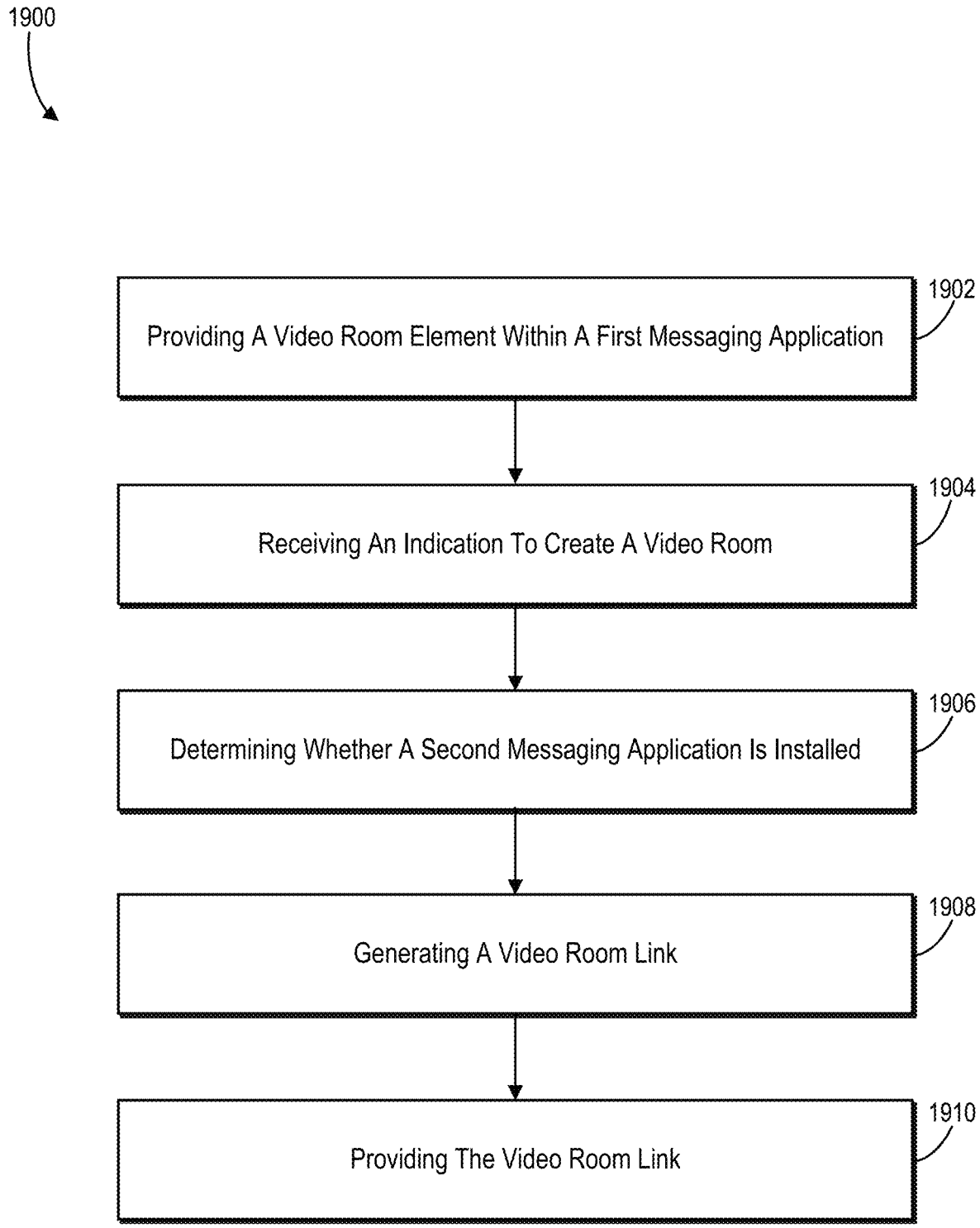
FIG. 19 illustrates an example flow of acts for generating and providing a video room link utilizing functions of a second messaging application based on user interaction within a first messaging application in accordance with one or more embodiments.

While FIG. 19 illustrates acts according to some embodiments, alternative embodiments may omit, add to, reorder, and/or modify any of the acts shown in FIG. 19. The acts of FIG. 19 can be performed as part of a method. Alternatively, a non-transitory computer readable medium can comprise instructions, that when executed by one or more processors, cause a computing device to perform the acts of FIG. 19. In still further embodiments, a system can perform the acts of FIG. 19. Additionally, the acts described herein may be repeated or performed in parallel with one another or in parallel with different instances of the same or other similar acts.

FIG. 19 illustrates an example series of acts 1900 for generating and providing a video room link for a video room by accessing functions of a second messaging application as a result of user interaction within a first messaging application. The series of acts 1900 includes an act 1902 of providing a video room element within a first messaging application. In particular, the act 1902 can include providing, for display within a chat interface of a first messaging application on a creator device, a video room element selectable to generate a video room for video conferencing between two or more devices. The series of acts 1900 can include an act of generating, based on a social graph indicating connections between a creator associated with the creator device and co-users of a social networking system, a video call list interface for display within the first messaging application on the creator device and comprising a listing of co-users with a connection to the user in the social graph and who are eligible for inviting to a video room via the first messaging application. The series of acts 1900 can also include an act of providing a second video room element for display within the video call list interface.

As shown, the series of acts 1900 also includes an act 1904 of receiving an indication to create a video room. In particular, the act 1904 can involve receiving, from the creator device and based on user interaction selecting the video room element, an indication to generate the video room.

The series of acts 1900 further includes an act 1906 of determining whether a second messaging application is installed. In particular, the act 1906 can involve determining, based on the indication to generate the video room, whether a second messaging application is installed on the creator device.

As further illustrated in FIG. 19, the series of acts 1900 includes an act 1908 of generating a video room link. In particular, the act 1908 can involve, based on determining whether a second messaging application is installed on the creator device, selecting between the second messaging application and a browser application to generate a video room link that is sharable to invite invitee devices within a chat associated with the chat interface of the first messaging application to join the video room. In some cases, the act 1908 can involve, based on determining that the second messaging application is installed on the creator device, utilizing one or more functions of the second messaging application to generate a video room link that is sharable to invite invitee devices within a chat associated with the chat interface of the first messaging application to join the video room. Additionally (or alternatively), the act 1908 can involve, based on determining that the second messaging application is not installed on the creator device, utilizing a browser application to generate the video room link that is sharable to invite invitee devices within the chat associated with the chat interface of the first messaging application to join the video room.

Further, the series of acts 1900 can include an act 1910 of providing the video room link. In particular, the act 1910 can involve, based on generating the video room link, automatically providing the video room link for display within the chat interface of the first messaging application on the creator device and the invitee devices. The act 1910 (or another act in the series of acts 1900) can include an act of, based on generating the video room link, automatically surfacing the video room link within in a social networking feed of one or more of the co-users based on the connections between the user and the one or more co-users. The act 1910 can involve determining a location within a chat thread displayed at a time when the video room element is selected and providing the video room link for display at the location within the chat thread.

The series of acts 1900 can also include an act of, based on generating the video room link, providing a chat selection interface for display within the first messaging application and comprising a listing of chat elements selectable for sharing the video room link within chats associated with the creator device. The series of acts 1900 can also include acts of determining that the video room link has been shared at least a threshold number of times and, based on determining that the video room link has been shared at least the threshold number of times, restricting the number of invitees with whom a video room link can be shared with a single message.

Further, the series of acts 1900 can include an act of, based on receiving indications of user interaction with the video room link causing a first invitee device associated with the second messaging application to access the second messaging application for joining the video room and causing a second invitee not associated with the second messaging application to access a browser for joining the video room.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 20:
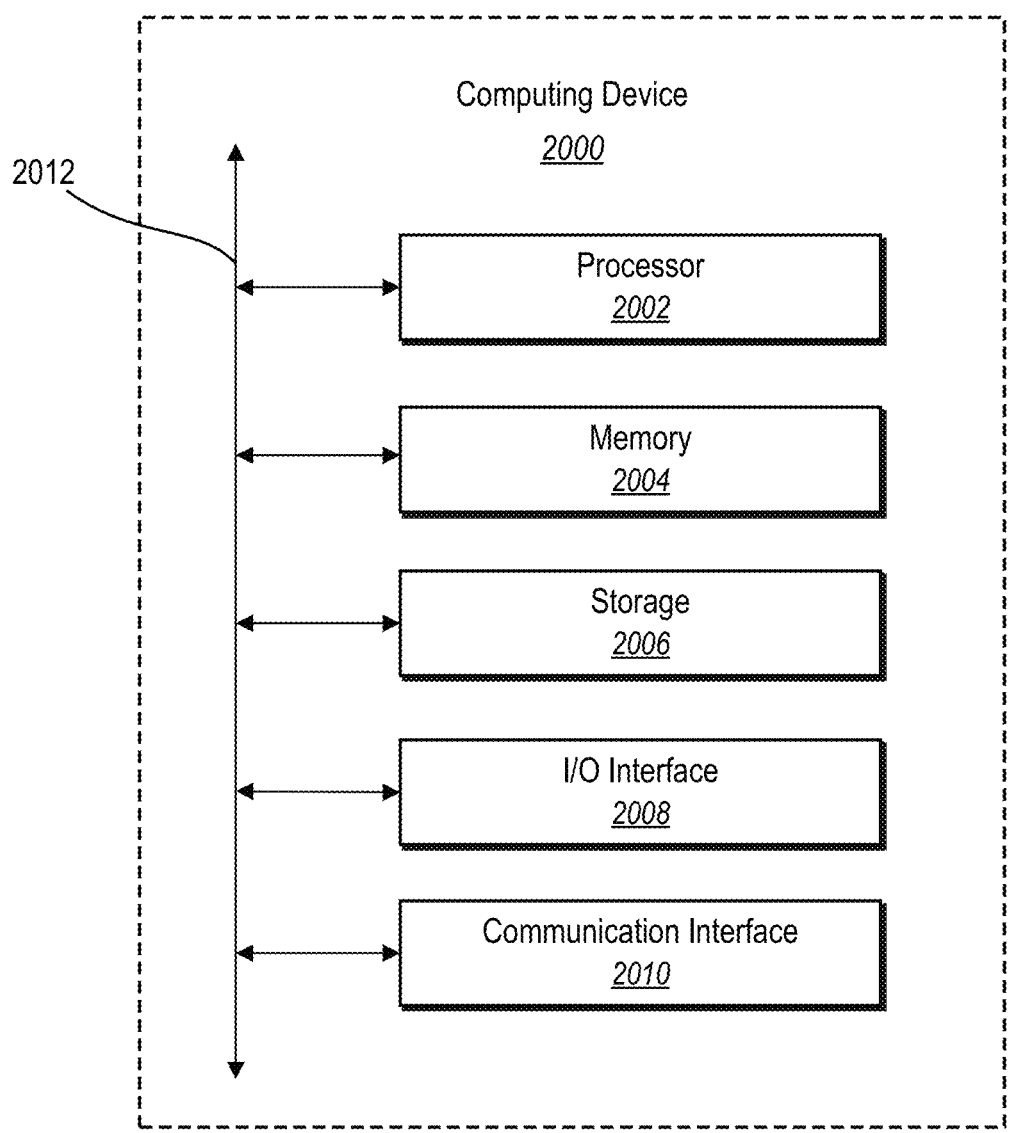
FIG. 20 illustrates a block diagram of an example computing device in accordance with one or more embodiments.

FIG. 20 illustrates a block diagram of an example computing device 2000 (e.g., the server(s) 106, the creator device 108, and/or the invitee device 114) that may be configured to perform one or more of the processes described above. One will appreciate that one or more computing devices such as the computing device 2000 may implement the video room system 102. As shown by FIG. 20, the computing device 2000 can comprise a processor 2002, a memory 2004, a storage device 2006, an I/O interface 2008, and a communication interface 2010, which may be communicatively coupled by way of a communication infrastructure 2012. While an example computing device 2000 is shown in FIG. 20, the components illustrated in FIG. 20 are not intended to be limiting. Additional or alternative components may be used in other embodiments. Furthermore, in certain embodiments, the computing device 2000 can include fewer components than those shown in FIG. 20. Components of the computing device 2000 shown in FIG. 20 will now be described in additional detail.

In one or more embodiments, the processor 2002 includes hardware for executing instructions, such as those making up a computer program. For example, to execute instructions, the processor 2002 may retrieve (or fetch) the instructions from an internal register, an internal cache, the memory 2004, or the storage device 2006 and decode and execute them. In one or more embodiments, the processor 2002 may include one or more internal caches for data, instructions, or addresses. For example, the processor 2002 may include one or more instruction caches, one or more data caches, and one or more translation lookaside buffers (TLBs). Instructions in the instruction caches may be copies of instructions in the memory 2004 or the storage device 2006.

The memory 2004 may be used for storing data, metadata, and programs for execution by the processor(s). The memory 2004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 2004 may be internal or distributed memory.

The storage device 2006 includes storage for storing data or instructions. For example, storage device 2006 can comprise a non-transitory storage medium described above. The storage device 2006 may include a hard disk drive (HDD), a floppy disk drive, flash memory, an optical disc, a magneto-optical disc, magnetic tape, or a Universal Serial Bus (USB) drive or a combination of two or more of these. The storage device 2006 may include removable or non-removable (or fixed) media, where appropriate. The storage device 2006 may be internal or external to the computing device 2000. In one or more embodiments, the storage device 2006 is non-volatile, solid-state memory. In other embodiments, the storage device 2006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 2008 allows a user to provide input to, receive output from, and otherwise transfer data to and receive data from computing device 2000. The I/O interface 2008 may include a mouse, a keypad or a keyboard, a touch screen, a camera, an optical scanner, network interface, modem, another known I/O devices or a combination of such I/O interfaces. The I/O interface 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 2008 is configured to provide graphical data to a display for presentation to a user. The graphical data may be representative of one or more graphical user interfaces and/or any other graphical content as may serve a particular implementation.

The communication interface 2010 can include hardware, software, or both. In any event, the communication interface 2010 can provide one or more interfaces for communication (e.g., packet-based communication) between the computing device 2000 and one or more other computing devices or networks. For example, the communication interface 2010 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 2010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 2010 may facilitate communications with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination thereof.

Additionally, the communication interface 2010 may facilitate communications across various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 2012 may include hardware, software, or both that connects components of the computing device 2000 to each other. For example, the communication infrastructure 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the video room system 102 can operate as a social networking system in various embodiments. In addition to the description given above, a social networking system may enable its users (such as persons or organizations) to interact with the system and with each other. The social networking system may, with input from a user, create and store in the social networking system a social media account associated with the user. The social media account may include demographic information, communication-channel information, and information on personal interests of the user. The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users.

Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 21:
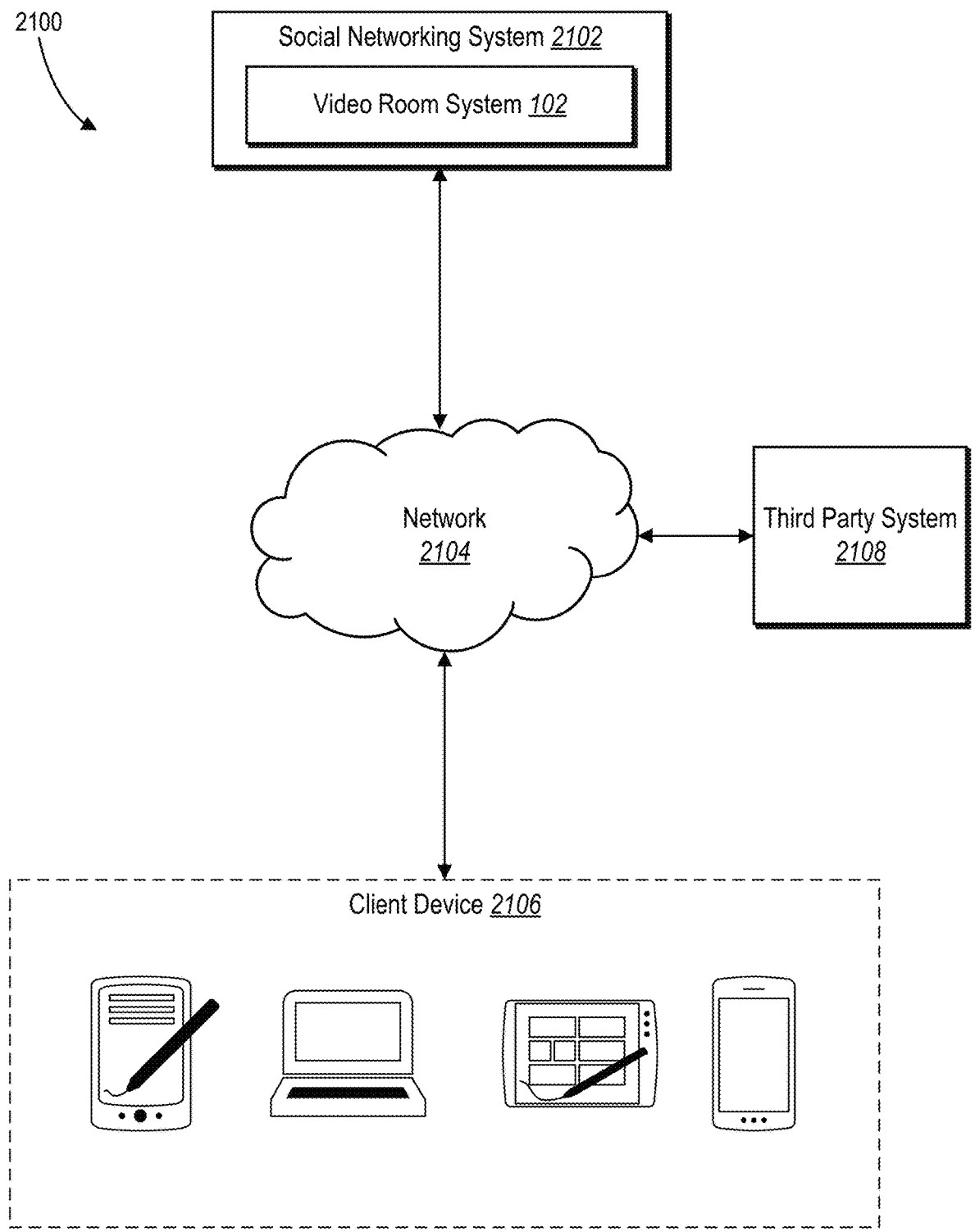
FIG. 21 illustrates an example network environment of a networking system in accordance with one or more embodiments.

FIG. 21 illustrates an example network environment 2100 of a networking system. The network environment 2100 includes a social networking system 2102 (e.g., the social networking system 104), a client device 2106, and a third-party system 2108 connected to each other by a network 2104. Although FIG. 21 illustrates a particular arrangement of the social networking system 2102, the client device 2106, the third-party system 2108, and the network 2104, this disclosure contemplates any suitable arrangement of the devices, systems, and networks. For example, the client device 2106 and the social networking system 2102 may be physically or logically co-located with each other in whole, or in part. Moreover, although FIG. 21 illustrates a single client device 2106, the social networking system 2102, the third-party system 2108, and the network 2104, this disclosure contemplates any suitable number of devices, systems, and networks.

This disclosure contemplates any suitable network. For example, one or more portions of the network 2104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 2104 may include one or more networks.

Links may connect the social networking system 2102, the client device 2106, and the third-party system 2108 to the network 2104 or to each other. In particular embodiments, one or more links include one or more wireline (e.g., Digital Subscriber Line (DSL) or Data Over Cable Service Interface Specification (DOCSIS)), wireless (e.g., Wi-Fi or Worldwide Interoperability for Microwave Access (WiMAX)), or optical (e.g., Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 2100. One or more first links may differ in one or more respects from one or more second links.

In particular embodiments, the client device 2106 may be an electronic device including hardware, software, or embedded logic components or a combination of two or more such components and capable of carrying out the appropriate functionalities implemented or supported by the client device 2106. For example, the client device 2106 may include any of the computing devices discussed above in relation to FIG. 20. The client device 2106 may enable a network user to access the network 2104. The client device 2106 may enable its user to communicate with other users associated with other user/client devices.

In particular embodiments, the client device 2106 may include a web browser and may have one or more add-ons, plug-ins, or other extensions (e.g., toolbars). A user at the client device 2106 may enter a Uniform Resource Locator (URL) or other address directing the web browser to a particular server (such as server, or a server associated with the third-party system 2108), and the web browser may generate a Hypertext Transfer Protocol (HTTP) request and communicate the HTTP request to server. The server may accept the HTTP request and communicate to the client device 2106 one or more Hypertext Markup Language (HTML) files responsive to the HTTP request.

The client device 2106 may render a webpage based on the HTML files from the server for presentation to the user. For example, webpages may render from HTML files, Extensible Hypertext Markup Language (XHTML) files, or Extensible Markup Language (XML) files, according to particular needs. Such pages may also execute scripts such as those written in JAVASCRIPT, JAVA, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social networking system 2102 may be a network-addressable computing system that can host an online network of users (e.g., a social networking system or an electronic messaging system). In some embodiments, such as the illustrated embodiment, the social networking system 2102 implements the video room system 102.

The social networking system 2102 may generate, store, receive, and send networking data, such as user-profile data, concept-profile data, graph information (e.g., social-graph information), or other suitable data related to the online network of users. The social networking system 2102 may be accessed by the other components of network environment 2100 either directly or via the network 2104. In particular embodiments, the social networking system 2102 may include one or more servers. Each server may be a unitary server or a distributed server spanning multiple computers or multiple datacenters. Servers may be of various types, such as web server, news server, mail server, message server, advertising server, file server, application server, exchange server, database server, proxy server, another server suitable for performing functions or processes described herein, or any combination thereof.

In one or more embodiments, each server may include hardware, software, or embedded logic components or a combination of two or more such components for carrying out the appropriate functionalities implemented or supported by a server. In particular embodiments, the social networking system 2102 may include one or more data stores. Data stores may be used to store various types of information. In particular embodiments, the information stored in data stores may be organized according to specific data structures. In particular embodiments, each data store may be a relational, columnar, correlation, or another suitable database. Although this disclosure describes or illustrates particular types of databases, this disclosure contemplates any suitable types of databases. Particular embodiments may provide interfaces that enable the social networking system 2102, the client device 2106, or the third-party system 2108 to manage, retrieve, modify, add, or delete, the information stored in a data store.

In particular embodiments, the social networking system 2102 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. The social networking system 2102 may provide users of the online network of users the ability to communicate and interact with other users. In particular embodiments, users may join the online network of users via the social networking system 2102 and then add connections (e.g., relationships) to a number of other users of the social networking system 2102 whom they want to be connected to. Herein, the term "friend" may refer to any other user of the social networking system 2102 with whom a user has formed a connection, association, or relationship via the social networking system 2102.

In particular embodiments, the social networking system 2102 may provide users with the ability to take actions on various types of items or objects, supported by the social networking system 2102. For example, the items and objects may include groups or social networks to which users of the social networking system 2102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social networking system 2102 or by an external system of the third-party system 2108, which is separate from the social networking system 2102 and coupled to the social networking system 2102 via the network 2104.

In particular embodiments, the social networking system 2102 may be capable of linking a variety of entities. For example, the social networking system 2102 may enable users to interact with each other as well as receive content from the third-party systems 2108 or other entities, or to allow users to interact with these entities through an application programming interfaces (API) or other communication channels.

In particular embodiments, the third-party system 2108 may include one or more types of servers, one or more data stores, one or more interfaces, including but not limited to APIs, one or more web services, one or more content sources, one or more networks, or any other suitable components, e.g., that servers may communicate with. The third-party system 2108 may be operated by a different entity from an entity operating the social networking system 2102. In particular embodiments, however, the social networking system 2102 and the third-party systems 2108 may operate in conjunction with each other to provide social networking services to users of the social networking system 2102 or the third-party systems 2108. In this sense, the social networking system 2102 may provide a platform, or backbone, which other systems, such as the third-party systems 2108, may use to provide social networking services and functionality to users across the Internet.

In particular embodiments, the third-party system 2108 may include a third-party content object provider. A third-party content object provider may include one or more sources of content objects, which may be communicated to a client device 2106. For example, content objects may include information regarding things or activities of interest to the user, such as movie showtimes, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social networking system 2102 also includes user-generated content objects, which may enhance a user's interactions with the social networking system 2102. User-generated content may include anything a user can add, upload, send, or "post" to the social networking system 2102. For example, a user communicates posts to the social networking system 2102 from a client device 2106. Posts may include data such as status updates or other textual data, location information, photos, videos, links, music or other similar data or media. Content may also be added to the social networking system 2102 by a third-party through a "communication channel," such as a newsfeed or stream.

In particular embodiments, the social networking system 2102 may include a variety of servers, sub-systems, programs, modules, logs, and data stores. In particular embodiments, the social networking system 2102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social networking system 2102 may also include suitable components such as network interfaces, security mechanisms, load balancers, failover servers, management-and-network-operations consoles, other suitable components, or any suitable combination thereof. In particular embodiments, the social networking system 2102 may include one or more user-profile stores for storing social media accounts.

A social media account may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. For example, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes.

The connection information may also include user-defined connections between different users and content (both internal and external). A web server may be used for linking the social networking system 2102 to one or more client device 2106 or one or more the third-party system 2108 via the network 2104. The web server may include a mail server or other messaging functionality for receiving and routing messages between the social networking system 2102 and one or more client device 2106. An API-request server may allow the third-party system 2108 to access information from the social networking system 2102 by calling one or more APIs. An action logger may be used to receive communications from a web server about a user's actions on or off social networking system 2102. In conjunction with the action log, a third-party-content-object log may be maintained of user exposures to third-party-content objects. A notification controller may provide information regarding content objects to a client device 2106.

Information may be pushed to a client device 2106 as notifications, or information may be pulled from client device 2106 responsive to a request received from client device 2106. Authorization servers may be used to enforce one or more privacy settings of the users of the social networking system 2102. A privacy setting of a user determines how particular information associated with a user can be shared. The authorization server may allow users to opt in to or opt out of having their actions logged by the social networking system 2102 or shared with other systems (e.g., the third-party system 2108), such as by setting appropriate privacy settings. Third-party-content-object stores may be used to store content objects received from third parties, such as the third-party system 2108. Location stores may be used for storing location information received from client device 2106 associated with users. Advertisement-pricing modules may combine social information, the current time, location information, or other suitable information to provide relevant advertisements, in the form of notifications, to a user.

Figure 22:
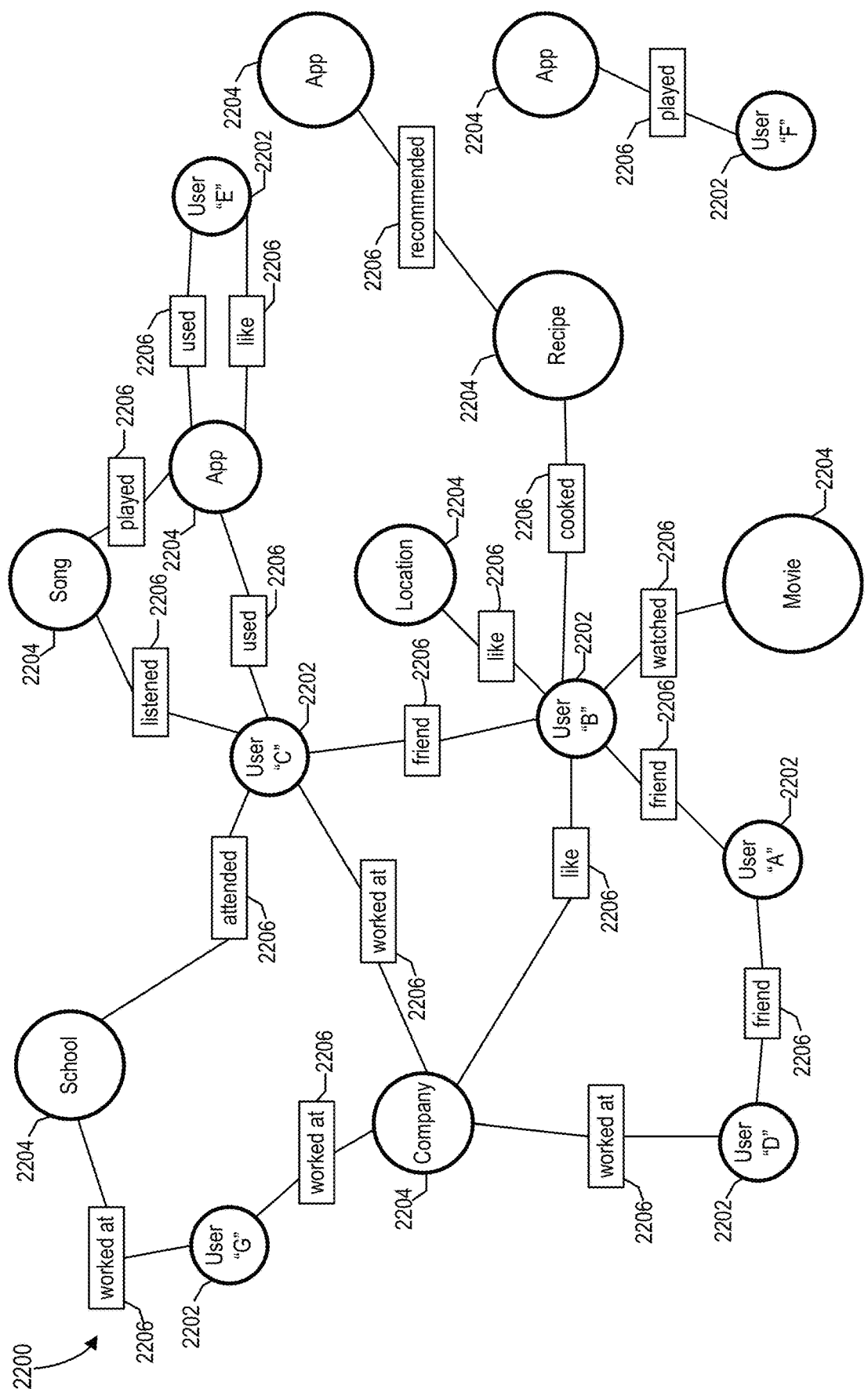
FIG. 22 illustrates a social graph in accordance with one or more embodiments.

FIG. 22 illustrates example social graph 2200. In particular embodiments, the social networking system 2102 may store one or more social graphs 2200 in one or more data stores. In particular embodiments, social graph 2200 may include multiple nodes—which may include multiple user nodes 2202 or multiple concept nodes 2204—and multiple edges 2206 connecting the nodes. Example social graph 2200 illustrated in FIG. 22 is shown, for didactic purposes, in a two-dimensional visual map representation. In particular embodiments, the social networking system 2102, the client device 2106, or the third-party system 2108 may access social graph 2200 and related social-graph information for suitable applications. The nodes and edges of social graph 2200 may be stored as data objects, for example, in a data store (such as a social-graph database). Such a data store may include one or more searchable or quarriable indexes of nodes or edges of social graph 2200.

In particular embodiments, a user node 2202 may correspond to a user of the social networking system 2102. For example, a user may be an individual (human user), an entity (e.g., an enterprise, business, or third-party application), or a group (e.g., of individuals or entities) that interacts or communicates with or over social networking system 2102. In particular embodiments, when a user registers for an account with the social networking system 2102, the social networking system 2102 may create a user node 2202 corresponding to the user and store the user node 2202 in one or more data stores. Users and user nodes 2202 described herein may, where appropriate, refer to registered users and user nodes 2202 associated with registered users.

In addition, or as an alternative, users and user nodes 2202 described herein may, where appropriate, refer to users that have not registered with the social networking system 2102. In particular embodiments, a user node 2202 may be associated with information provided by a user or information gathered by various systems, including the social networking system 2102. For example, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 2204 may correspond to a concept. For example, a concept may correspond to a place (e.g., a movie theater, restaurant, landmark, or city); a website (e.g., a website associated with social networking system 2102 or a third-party website associated with a web-application server); an entity (e.g., a person, business, group, sports team, or celebrity); a resource (e.g., an audio file, video file, digital photo, text file, structured document, or application) which may be located within the social networking system 2102 or on an external server, such as a web-application server; real or intellectual property (e.g., a sculpture, painting, movie, game, song, idea, photograph, or written work); a game; an activity; an idea or theory; another suitable concept; or two or more such concepts. A concept node 2204 may be associated with information of a concept provided by a user or information gathered by various systems, including the social networking system 2102. For example, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 2204 may be associated with one or more data objects corresponding to information associated with concept node 2204. In particular embodiments, a concept node 2204 may correspond to one or more webpages.

In particular embodiments, a node in the social graph 2200 may represent or be represented by a webpage (which may be referred to as a "profile page"). Profile pages may be hosted by or accessible to the social networking system 2102. Profile pages may also be hosted on third-party websites associated with a third-party system 2108. For example, a profile page corresponding to a particular external webpage may be the particular external webpage, and the profile page may correspond to a particular concept node 2204. Profile pages may be viewable by all or a selected subset of other users. For example, a user node 2202 may have a corresponding user-profile page in which the corresponding user may add content, make declarations, or otherwise express himself or herself. As another example and not by way of limitation, a concept node 2204 may have a corresponding concept-profile page in which one or more users may add content, make declarations, or express themselves, particularly in relation to the concept corresponding to concept node 2204.

In particular embodiments, a concept node 2204 may represent a third-party webpage or resource hosted by the third-party system 2108. The third-party webpage or resource may include, among other elements, content, a selectable or another icon, or another inter-actable object (which may be implemented, for example, in JavaScript, AJAX, or PHP codes) representing an action or activity. For example, a third-party webpage may include a selectable icon such as "like," "check-in," "eat," "recommend," or another suitable action or activity. A user viewing the third-party webpage may perform an action by selecting one of the icons (e.g., "eat"), causing a client device 2106 to send to the social networking system 2102 a message indicating the user's action. In response to the message, the social networking system 2102 may create an edge (e.g., an "eat" edge) between a user node 2202 corresponding to the user and a concept node 2204 corresponding to the third-party webpage or resource and store edge 2206 in one or more data stores.

In particular embodiments, a pair of nodes in the social graph 2200 may be connected to each other by one or more edges 2206. An edge 2206 connecting a pair of nodes may represent a relationship between the pair of nodes. In particular embodiments, an edge 2206 may include or represent one or more data objects or attributes corresponding to the relationship between a pair of nodes. For example, a first user may indicate that a second user is a "friend" of the first user. In response to this indication, the social networking system 2102 may send a "friend request" to the second user. If the second user confirms the "friend request," social networking system 2102 may create an edge 2206 connecting the first user's user node 2202 to the second user's user node 2202 in the social graph 2200 and store edge 2206 as social-graph information in one or more of data stores. In the example of FIG. 22, social graph 2200 includes an edge 2206 indicating a friend relation between user nodes 2202 of user "A" and user "B" and an edge indicating a friend relation between user nodes 2202 of user "C" and user "B." Although this disclosure describes or illustrates particular edges 2206 with particular attributes connecting particular user nodes 2202, this disclosure contemplates any suitable edges 2206 with any suitable attributes connecting user nodes 2202. For example, an edge 2206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 2200 by one or more edges 2206.

In particular embodiments, an edge 2206 between a user node 2202 and a concept node 2204 may represent a particular action or activity performed by a user associated with user node 2202 toward a concept associated with a concept node 2204. For example, as illustrated in FIG. 22, a user may "like," "attended," "played," "listened,"

"cooked," "worked at," or "watched" a concept, each of which may correspond to an edge type or subtype. A concept-profile page corresponding to a concept node 2204 may include, for example, a selectable "check-in" icon (e.g., a clickable "check-in" icon) or a selectable "add to favorites" icon. Similarly, after a user clicks these icons, the social networking system 2102 may create a "favorite" edge or a "check-in" edge in response to a user's action corresponding to a respective action.

As another example and not by way of limitation, a user (user "C") may listen to a particular song using a particular application (e.g., an online music application). In this case, the social networking system 2102 may create a "listened" edge 2206 and a "used" edge (as illustrated in FIG. 22) between user nodes 2202 corresponding to the user and concept nodes 2204 corresponding to the song and application to indicate that the user listened to the song and used the application.

Moreover, the social networking system 2102 may create a "played" edge 2206 (as illustrated in FIG. 22) between concept nodes 2204 corresponding to the song and the application to indicate that the particular song was played by the particular application. In this case, "played" edge 2206 corresponds to an action performed by an external application on an external audio file. Although this disclosure describes particular edges 2206 with particular attributes connecting user nodes 2202 and concept nodes 2204, this disclosure contemplates any suitable edges 2206 with any suitable attributes connecting user nodes 2202 and concept nodes 2204.

Furthermore, although this disclosure describes edges between a user node 2202 and a concept node 2204 representing a single relationship, this disclosure contemplates edges between a user node 2202 and a concept node 2204 representing one or more relationships. For example, an edge 2206 may represent both that a user likes and has used at a particular concept. Alternatively, another edge 2206 may represent each type of relationship (or multiples of a single relationship) between a user node 2202 and a concept node 2204 (as illustrated in FIG. 22 between user node 2202 for user "E" and concept node 2204).

In particular embodiments, the social networking system 2102 may create an edge 2206 between a user node 2202 and a concept node 2204 in the social graph 2200. For example, a user viewing a concept-profile page (e.g., by using a web browser or a special-purpose application hosted by the user's client device 2106) may indicate that he or she likes the concept represented by the concept node 2204 by clicking or selecting a "Like" icon, which may cause the user's client device 2106 to send to the social networking system 2102 a message indicating the user's liking of the concept associated with the concept-profile page.

In response to the message, the social networking system 2102 may create an edge 2206 between user node 2202 associated with the user and concept node 2204, as illustrated by "like" edge 2206 between the user and concept node 2204. In particular embodiments, the social networking system 2102 may store an edge 2206 in one or more data stores. In particular embodiments, an edge 2206 may be automatically formed by the social networking system 2102 in response to a particular user action. For example, if a first user uploads a picture, watches a movie, or listens to a song, an edge 2206 may be formed between user node 2202 corresponding to the first user and concept nodes 2204 corresponding to those concepts. Although this disclosure describes forming particular edges 2206 in particular manners, this disclosure contemplates forming any suitable edges 2206 in any suitable manner.

In particular embodiments, an advertisement may be text (which may be HTML-linked), one or more images (which may be HTML-linked), one or more videos, audio, one or more other types of files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on the social networking system 2102)

A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a predetermined area of a profile page of a user or other page, presented with additional information associated with the advertiser, bumped up or otherwise highlighted within news feeds or tickers of other users, or otherwise promoted. The advertiser may pay to have the social action promoted. For example, advertisements may be included among the search results of a search-results page, where sponsored content is promoted over non-sponsored content.

In particular embodiments, an advertisement may be requested for display within social networking system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. For example, the user may view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social networking system 2102 may execute or modify a particular action of the user.

An advertisement may also include social networking-system functionality that a user may interact with. For example, an advertisement may enable a user to "like" or otherwise endorse the advertisement by selecting an icon or link associated with the endorsement. As another example and not by way of limitation, an advertisement may enable a user to search (e.g., by executing a query) for content related to the advertiser. Similarly, a user may share the advertisement with another user (e.g., through the social networking system 2102) or RSVP (e.g., through the social networking system 2102) to an event associated with the advertisement. In addition, or as an alternative, an advertisement may include a social networking system context directed to the user. For example, an advertisement may display information about a friend of the user within the social networking system 2102 who has taken an action associated with the subject matter of the advertisement.

In particular embodiments, the social networking system 2102 may determine the social-graph affinity (which may be referred to herein as "affinity") of various social-graph entities for each other. Affinity may represent the strength of a relationship or level of interest between particular objects associated with the online network of users, such as users, concepts, content, actions, advertisements, other objects associated with the online network of users, or any suitable combination thereof. Affinity may also be determined with respect to objects associated with the third-party systems 2108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social networking system 2102 may measure or quantify social-graph affinity using an affinity coefficient (which may be referred to herein as "coefficient"). The coefficient may represent or quantify the strength of a relationship between particular objects associated with the online network of users. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online network of users. For example, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social networking system 2102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user. For example, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 2102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. For example, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social networking system 2102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social networking system 2102 may calculate a coefficient based on a user's actions. The social networking system 2102 may monitor such actions on the online network of users, on the third-party system 2108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, the social networking system 2102 may calculate a coefficient based on the user's actions with particular types of content. The content may be associated with the online network of users, the third-party system 2108, or another suitable system. The content may include users, profile pages, posts, news stories, headlines, instant messages, chat room conversations, emails, advertisements, pictures, video, music, other suitable objects, or any combination thereof. The social networking system 2102 may analyze a user's actions to determine whether one or more of the actions indicate an affinity for the subject matter, content, other users, and so forth. For example, if a user may make frequently posts content related to "coffee" or variants thereof, the social networking system 2102 may determine the user has a high coefficient with respect to the concept "coffee." Particular actions or types of actions may be assigned a higher weight and/or rating than other actions, which may affect the overall calculated coefficient. For example, if a first user emails a second user, the weight or the rating for the action may be higher than if the first user views the user-profile page for the second user.

In particular embodiments, the social networking system 2102 may calculate a coefficient based on the type of relationship between particular objects. Referencing the social graph 2200, the social networking system 2102 may analyze the number and/or type of edges 2206 connecting particular user nodes 2202 and concept nodes 2204 when calculating a coefficient. For example, user nodes 2202 that are connected by a spouse-type edge (representing that the two users are married) may be assigned a higher coefficient than a user nodes 2202 that are connected by a friend-type edge. In other words, depending upon the weights assigned to the actions and relationships for the particular user, the overall affinity may be determined to be higher for content about the user's spouse than for content about the user's friend.

In particular embodiments, the relationships a user has with another object may affect the weights and/or the ratings of the user's actions with respect to calculating the coefficient for that object. For example, if a user is tagged in a first photo, but merely likes a second photo, the social networking system 2102 may determine that the user has a higher coefficient with respect to the first photo than the second photo because having a tagged-in-type relationship with content may be assigned a higher weight and/or rating than having a like-type relationship with content.

In some embodiments, the social networking system 2102 may calculate a coefficient for a first user based on the relationship one or more second users have with a particular object. In other words, the connections and coefficients other users have with an object may affect the first user's coefficient for the object. For example, if a first user is connected to or has a high coefficient for one or more second users, and those second users are connected to or have a high coefficient for a particular object, the social networking system 2102 may determine that the first user should also have a relatively high coefficient for the particular object.

In one or more embodiments, the coefficient may be based on the degree of separation between particular objects. The degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends."

Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 2200. For example, social-graph entities that are closer in the social graph 2200 (i.e., fewer degrees of separation) may have a higher coefficient than entities that are further apart in the social graph 2200.

In particular embodiments, the social networking system 2102 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 2106 of the user). A first user may be more interested in other users or concepts that are closer to the first user. For example, if a user is one mile from an airport and two miles from a gas station, the social networking system 2102 may determine that the user has a higher coefficient for the airport than the gas station based on the proximity of the airport to the user.

In particular embodiments, the social networking system 2102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social networking system 2102 may provide information that is relevant to a user's interests and current circumstances, increasing the likelihood that they will find such information of interest.

In some embodiments, the social networking system 2102 may generate content based on coefficient information. Content objects may be provided or selected based on coefficients specific to a user. For example, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object.

In one or more embodiments, the social networking system 2102 may generate search results based on coefficient information. The search results for a particular user may be scored or ranked based on the coefficient associated with the search results with respect to the querying user. For example, search results corresponding to objects with higher coefficients may be ranked higher on a search-results page than results corresponding to objects having lower coefficients.

In particular embodiments, the social networking system 2102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online network of users, from the third-party system 2108 (e.g., via an API or another communication channel), or from another suitable system. In response to the request, the social networking system 2102 may calculate the coefficient (or access the coefficient information if it has previously been calculated and stored).

In various embodiments, the social networking system 2102 may measure an affinity with respect to a particular process. Different processes (both internal and external to the online network of users) may request a coefficient for a particular object or set of objects. The social networking system 2102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In particular embodiments, one or more of the content objects of the online network of users may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online network of users. Where the privacy settings for an object allow a particular user to access that object, the object may be described as being "visible" with respect to that user. For example, a user of the online network of users may specify privacy settings for a user-profile page identify a set of users that may access the work experience information on the user-profile page, thus excluding other users from accessing the information.

In particular embodiments, the privacy settings may specify a "blocked list" of users that should not be allowed to access certain information associated with the object. In other words, the blocked list may specify one or more users or entities for which an object is not visible. For example, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online network of users. For example, a particular concept node 2204 corresponding to a particular photo may have a privacy setting specifying that the photo may only be accessed by users tagged in the photo and their friends.

In particular embodiments, privacy settings may allow users to opt in or opt out of having their actions logged by the social networking system 2102 or shared with other systems (e.g., the third-party system 2108). In particular embodiments, the privacy settings associated with an object may specify any suitable granularity of permitted access or denial of access. For example, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of the third-party systems 2108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, the social networking system 2102 may send a request to the data store for the object. The request may identify the user associated with the request and may only be sent to the user (or a client device 2106 of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user.

In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method implemented by a video room system comprising:
    providing, for display within a chat interface of a first messaging application on a creator device, a video room element selectable to generate a video room for video conferencing between the creator device and one or more devices;
    receiving, from the creator device and based on user interaction selecting the video room element, an indication to generate the video room;
    based on determining that a second messaging application is installed on the creator device, generating, utilizing the second messaging application, a video room link that is sharable to invite invitee devices to join the video room;
    providing the video room link within the chat interface of the first messaging application on the creator device;
    sending the video room link to the one or more devices via a message thread between the creator device and the one or more devices on the first messaging application; and
    upon providing the video room link within the message thread on the first messaging application, automatically surfacing a graphical element for the video room link in a banner area of the first messaging application, the second messaging application, or within a social networking feed of one or more users of the one or more devices or the creator device.

2. The method of claim 1, wherein generating, utilizing the second messaging application, the video room link, comprises:
    transitioning to the second messaging application and surfacing a video room creation interface, provided by the second messaging application, that includes one or more selectable setting options for the video room.

3. The method of claim 2, further comprising receiving user input specifying one or more settings for the video room utilizing the one or more selectable setting options of the video room creation interface.

4. The method of claim 2, further comprising utilizing a user account of a networking system corresponding to the creator device on both the first messaging application and the second messaging application to generate the video room link in the second messaging application.

5. The method of claim 1, wherein transitioning from the second messaging application back to the first messaging application comprises opening a user interface of the first messaging application that was open prior to transitioning to the second messaging application.

6. The method of claim 1, wherein generating, utilizing the second messaging application, the video room link, comprises generating a virtual space accessible via the video room link.

7. The method of claim 1, wherein generating, utilizing the second messaging application, the video room link, comprises generating a data packet associated with the video room link that includes a chat thread identifier.

8. The method of claim 1, wherein the first messaging application comprises a smaller application with a first set of functions and the second messaging application comprises a larger application with an expanded set of functions.

9. A non-transitory computer readable medium comprising instructions that, when executed by at least one processor, cause the at least one processor to perform operations comprising:
 providing, for display within a chat interface of a first messaging application on a creator device, a video room element selectable to generate a video room for video conferencing between the creator device and one or more devices;
 receiving, from the creator device and based on user interaction selecting the video room element, an indication to generate the video room;
 based on determining that a second messaging application is installed on the creator device, generating, utilizing the second messaging application, a video room link that is sharable to invite invitee devices to join the video room;
 providing the video room link within the chat interface of the first messaging application on the creator device;
 sending the video room link to the one or more devices via a message thread between the creator device and the one or more devices on the first messaging application; and
 upon providing the video room link within the message thread on the first messaging application, automatically surfacing a graphical element for the video room link in a banner area of the first messaging application, the second messaging application, or within a social networking feed of one or more users of the one or more devices or the creator device.

10. The non-transitory computer readable medium of claim 9, wherein generating, utilizing the second messaging application, the video room link, comprises:
 surfacing a video room creation interface, provided by the second messaging application, that includes one or more selectable setting options for the video room.

11. The non-transitory computer readable medium of claim 10, further comprising instructions that, when executed by the at least one processor, cause the at least one processor to perform further operations comprising receiving user input specifying one or more settings for the video room utilizing the one or more selectable setting options of the video room creation interface, wherein the one or more selectable setting options comprise video room link access settings, device type settings, settings to set user accounts permitted to join the video room, or settings to set user accounts prevented from joining the video room.

12. The non-transitory computer readable medium of claim 9, further comprising instructions that, when executed by the at least one processor, cause the at least one processor to perform further operations comprising transitioning from the second messaging application back to the first messaging application by opening a user interface of the first messaging application that was open prior to transitioning to the second messaging application.

13. The non-transitory computer readable medium of claim 9, wherein generating, utilizing the second messaging application, the video room link, comprises generating a virtual space accessible via the video room link.

14. The non-transitory computer readable medium of claim 9, wherein generating, utilizing the second messaging application, the video room link utilizing one or more application program interfaces of the second messaging application to generate the video room link.

15. The non-transitory computer readable medium of claim 9, further comprising instructions that, when executed by the at least one processor, cause the at least one processor to open a video chat interface within the second messaging application in response to a selection of the video room link in the first messaging application.

16. A system comprising:
 at least one processor; and
 a non-transitory computer readable medium comprising instructions that, when executed by the at least one processor, cause the system to:
  provide, for display within a chat interface of a first messaging application on a creator device, a video room element selectable to generate a video room for video conferencing between the creator device and one or more devices;
  receive, from the creator device and based on user interaction selecting the video room element, an indication to generate the video room;
  based on determining that a second messaging application is installed on the creator device, generate, utilizing the second messaging application, a video room link that is sharable to invite invitee devices to join the video room;
  provide the video room link within the chat interface of the first messaging application on the creator device;
  send the video room link to the one or more devices via a message thread between the creator device and the one or more devices on the first messaging application; and
 upon providing the video room link within the message thread on the first messaging application, automatically surface a graphical element for the video room link in a banner area of the first messaging application, the second messaging application, or within a social networking feed of one or more users of the one or more devices or the creator device.

17. The system of claim 16, further comprising instructions that, when executed by the at least one processor, cause the system to:
 generate, based on a social graph indicating connections between a creator associated with the creator device and co-users of a social networking system, a video call list interface for display within the first messaging application on the creator device and comprising a listing of co-users with a connection to the creator in the social graph and who are eligible for inviting to a video room via the first messaging application; and provide a second video room element for display within the video call list interface.

18. The system of claim 17, further comprising instructions that, when executed by the at least one processor, cause the system to, based on generating the video room link, automatically surface the video room link within in a social networking feed of one or more of the co-users based on the connections between the creator and the one or more co-users.

19. The system of claim 16, further comprising instructions that, when executed by the at least one processor, cause the system to:

surface a video room creation interface, provided by the second messaging application, that includes one or more selectable setting options for the video room;

receive user input specifying one or more settings for the video room utilizing the one or more selectable setting options of the video room creation interface; and generating the video room based on the one or more settings.

20. The system of claim 16, further comprising instructions that, when executed by the at least one processor, cause the system to open a video chat interface within the second messaging application in response to a selection of the video room link in the first messaging application.

* * * * *